(12) United States Patent
Rivera et al.

(10) Patent No.: US 10,251,509 B2
(45) Date of Patent: Apr. 9, 2019

(54) COFFEE MAKER WITH MULTI AND SINGLE CUP MODES

(71) Applicants: Adrian Rivera, Whittier, CA (US); Kenneth L. Green, La Habra Heights, CA (US)

(72) Inventors: Adrian Rivera, Whittier, CA (US); Kenneth L. Green, La Habra Heights, CA (US)

(73) Assignee: Adrian Rivera, Whittier, CA (US)

( * ) Notice: Subject to any disclaimer, the term of this patent is extended or adjusted under 35 U.S.C. 154(b) by 0 days.

(21) Appl. No.: 15/046,757

(22) Filed: Feb. 18, 2016

(65) Prior Publication Data

US 2016/0242589 A1    Aug. 25, 2016

Related U.S. Application Data

(63) Continuation-in-part of application No. 12/762,262, filed on Apr. 16, 2010, which is a continuation-in-part of application No. 12/620,584, filed on Nov. 17, 2009, now Pat. No. 8,291,812, which is a continuation-in-part of application No. 12/610,181, filed on Oct. 30, 2009, now Pat. No. 8,621,981.

(51) Int. Cl.
  *A47J 31/02* (2006.01)
  *A47J 31/44* (2006.01)
  *A47J 31/06* (2006.01)

(52) U.S. Cl.
  CPC ......... *A47J 31/446* (2013.01); *A47J 31/0647* (2013.01)

(58) Field of Classification Search
  CPC ........................ A47J 31/0647; A47J 31/446

USPC .............. 99/281, 282–323; 111/109, 116; 222/108, 109; 141/41–88; 219/621–628, 219/635, 400

See application file for complete search history.

(56) References Cited

U.S. PATENT DOCUMENTS

| 237,404 | A | * | 2/1881 | McKeever | ............... | B67D 1/16 |
| | | | | | | 222/108 |
| 2,013,172 | A | * | 9/1935 | Petrone | ................... | A47J 31/52 |
| | | | | | | 219/507 |
| 2,433,815 | A | | 12/1947 | Charl | | |

(Continued)

FOREIGN PATENT DOCUMENTS

WO   WO 2005/092160 A1   10/2005
WO   WO 2008006556 A2 *  1/2008  ............ A47J 31/007

OTHER PUBLICATIONS

U.S. Appl. No. 61/184,933, filed Sep. 2000, Roberson.

*Primary Examiner* — Tu B Hoang
*Assistant Examiner* — Diallo I Duniver
(74) *Attorney, Agent, or Firm* — IP Strategies

(57) ABSTRACT

A multi-mode coffee maker facilitates switching between a carafe mode and a single cup mode. The coffee maker includes switches for selecting the amount of coffee brewed, a drip valve normally closed to prevent dripping and opened by insertion of a carafe or a single cup adapter into the coffee maker, and a hot plate for maintaining the temperature of coffee in the carafe, the hot plate independent switchable on and off. A single cup adapter includes a swing-out platform which cooperates with a multi-mode coffee maker to allow switching from a small amount to a large amount of brewed drink when the platform is moved to provide space for a large cup. A slide may also be provided to select the mode.

1 Claim, 31 Drawing Sheets

(56) References Cited

U.S. PATENT DOCUMENTS

| | | | | |
|---|---|---|---|---|
| 2,673,111 A | * | 3/1954 | Teetor | E05C 19/16 292/251.5 |
| 3,115,822 A | | 12/1963 | Totten | |
| 3,120,170 A | | 2/1964 | Garte | |
| 3,136,241 A | | 6/1964 | Price | |
| 3,199,682 A | | 8/1965 | Scholtz | |
| 3,224,360 A | | 12/1965 | Wickenberg et al. | |
| 3,316,388 A | | 4/1967 | Wickenberg et al. | |
| 3,384,004 A | | 5/1968 | Perlman et al. | |
| 3,405,630 A | | 10/1968 | Weber, III | |
| 3,431,002 A | * | 3/1969 | Melgaard | E05C 19/16 292/251.5 |
| 3,583,308 A | | 6/1971 | Williams | |
| 3,607,297 A | | 9/1971 | Fasano | |
| 3,757,670 A | | 9/1973 | Laama et al. | |
| 3,844,206 A | | 10/1974 | Weber | |
| 3,958,502 A | | 5/1976 | Vitous | |
| 4,164,644 A | | 8/1979 | Remsnyder et al. | |
| 4,253,385 A | | 3/1981 | Illy | |
| 4,286,515 A | | 9/1981 | Baumann et al. | |
| 4,508,023 A | * | 4/1985 | Naya | A47J 31/0573 392/467 |
| 4,603,621 A | | 8/1986 | Roberts | |
| 4,703,687 A | | 11/1987 | Wei | |
| 4,998,463 A | | 3/1991 | Precht et al. | |
| 5,000,082 A | | 3/1991 | Lassota | |
| 5,046,409 A | | 9/1991 | Henn | |
| 5,123,335 A | | 6/1992 | Aselu | |
| 5,183,998 A | * | 2/1993 | Hoffman | A47J 31/52 219/492 |
| 5,233,914 A | | 8/1993 | English | |
| 5,325,765 A | | 7/1994 | Sylvan et al. | |
| 5,335,589 A | | 8/1994 | Yerves et al. | |
| 5,526,733 A | | 6/1996 | Klawuhn et al. | |
| 5,582,730 A | | 12/1996 | Hugentobler | |
| 5,636,563 A | | 6/1997 | Opperman et al. | |
| 5,676,041 A | | 10/1997 | Glucksman et al. | |
| 5,829,340 A | | 11/1998 | Yang | |
| 5,840,189 A | | 11/1998 | Sylvan et al. | |
| 5,870,943 A | | 2/1999 | Levi et al. | |
| 5,875,704 A | | 3/1999 | Levi et al. | |
| 5,887,508 A | | 3/1999 | Estaun | |
| 5,921,783 A | * | 7/1999 | Fritsch | H01R 13/703 439/38 |
| D431,423 S | | 10/2000 | Ohm et al. | |
| 6,136,352 A | | 10/2000 | Silverstein et al. | |
| 6,164,191 A | | 12/2000 | Liu et al. | |
| 6,189,438 B1 | | 2/2001 | Bielfeldt et al. | |
| 6,339,985 B1 | * | 1/2002 | Whitney | A47J 31/061 99/286 |
| 6,606,938 B2 | | 8/2003 | Taylor | |
| 6,655,260 B2 | | 12/2003 | Lazaris et al. | |
| 6,740,345 B2 | | 5/2004 | Cai | |
| 6,832,542 B2 | | 12/2004 | Hu et al. | |
| 6,843,165 B2 | | 1/2005 | Stoner et al. | |
| 6,904,840 B1 | | 6/2005 | Pfeifer et al. | |
| 6,948,420 B2 | | 9/2005 | Kirschner et al. | |
| 7,047,870 B2 | | 5/2006 | Gantt et al. | |
| 7,131,369 B2 | | 11/2006 | Gantt et al. | |
| 7,320,217 B2 | | 1/2008 | Casetllani | |
| 7,946,217 B2 | | 5/2011 | Favre et al. | |
| 8,047,127 B2 | | 11/2011 | Lin | |
| 2002/0035929 A1 | | 3/2002 | Kanba et al. | |
| 2002/0148356 A1 | | 10/2002 | Lazaris et al. | |
| 2004/0118290 A1 | | 6/2004 | Cai | |
| 2005/0279216 A1 | * | 12/2005 | Miller | A47J 41/0016 99/279 |
| 2006/0159815 A1 | | 7/2006 | Crook et al. | |
| 2006/0196364 A1 | | 9/2006 | Kirschner | |
| 2006/0254428 A1 | | 11/2006 | Glucksman et al. | |
| 2007/0209521 A1 | * | 9/2007 | Boussemart | A47J 31/061 99/275 |
| 2008/0148954 A1 | * | 6/2008 | Maldanis | A47J 31/58 99/279 |
| 2009/0020017 A1 | * | 1/2009 | Lin | A47J 31/04 99/284 |
| 2009/0229471 A1 | | 9/2009 | Lun et al. | |
| 2010/0083843 A1 | | 4/2010 | Denisart et al. | |

\* cited by examiner

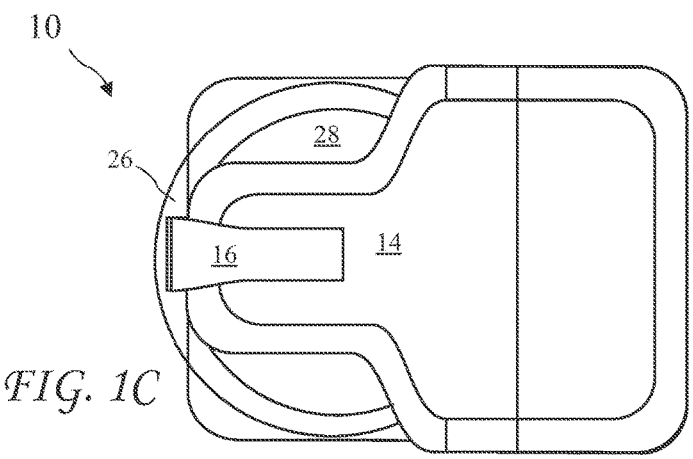
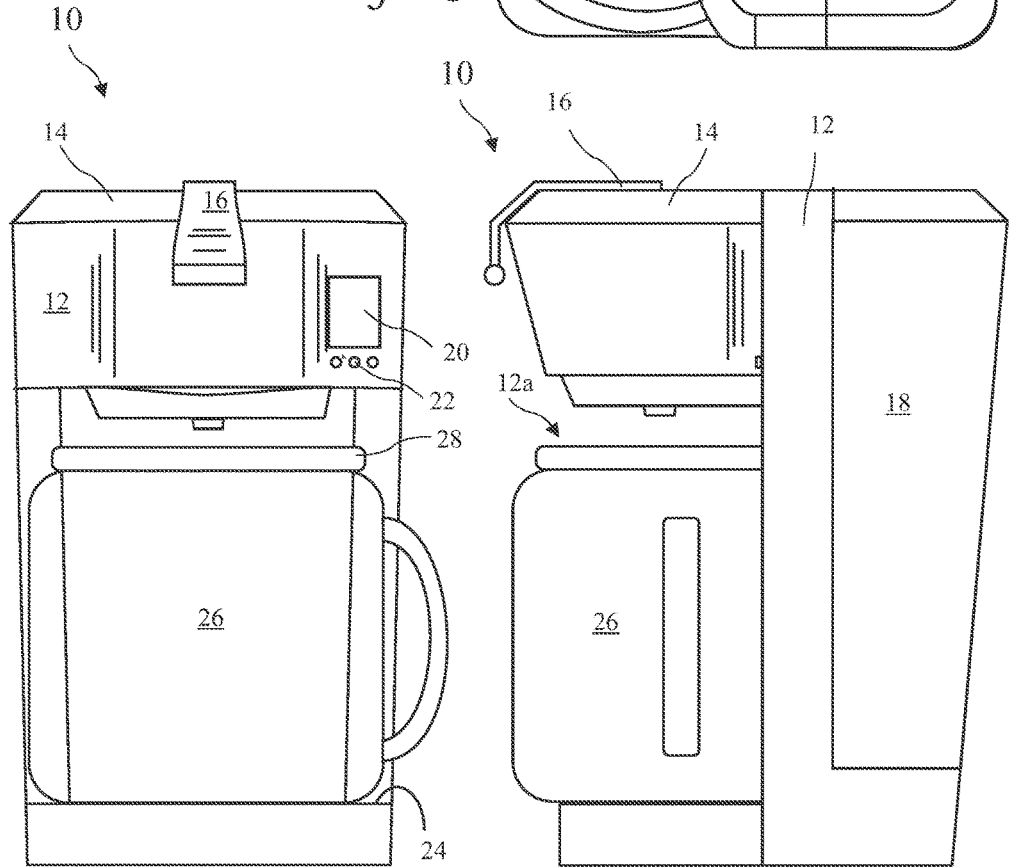
FIG. 1C
FIG. 1A
FIG. 1B

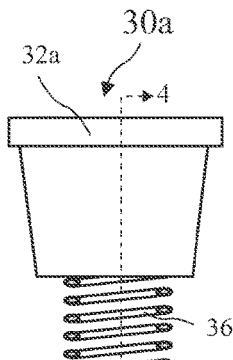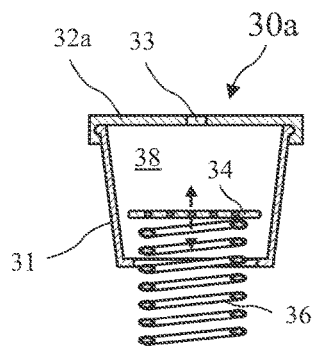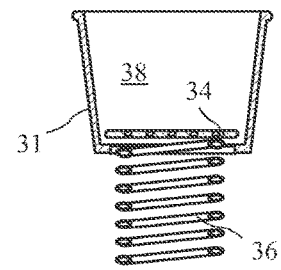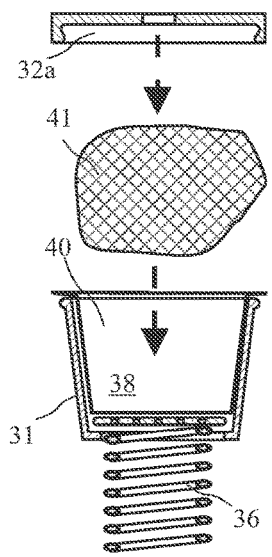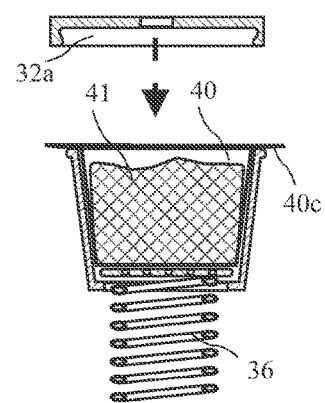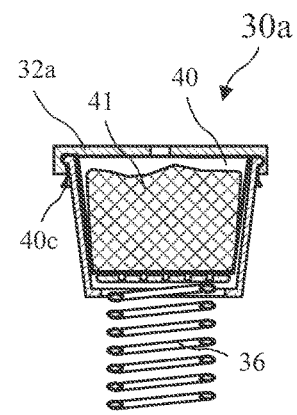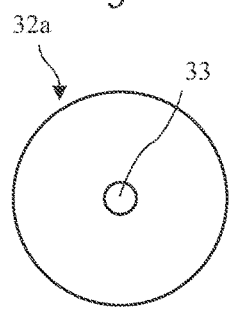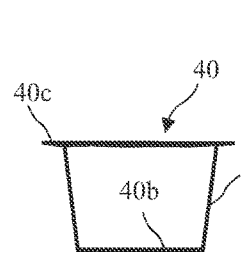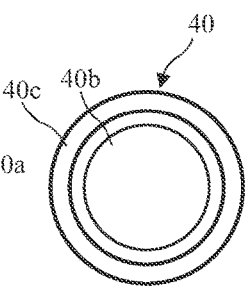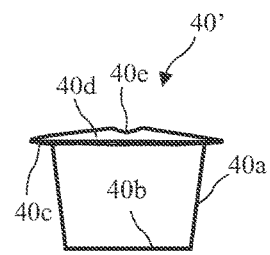

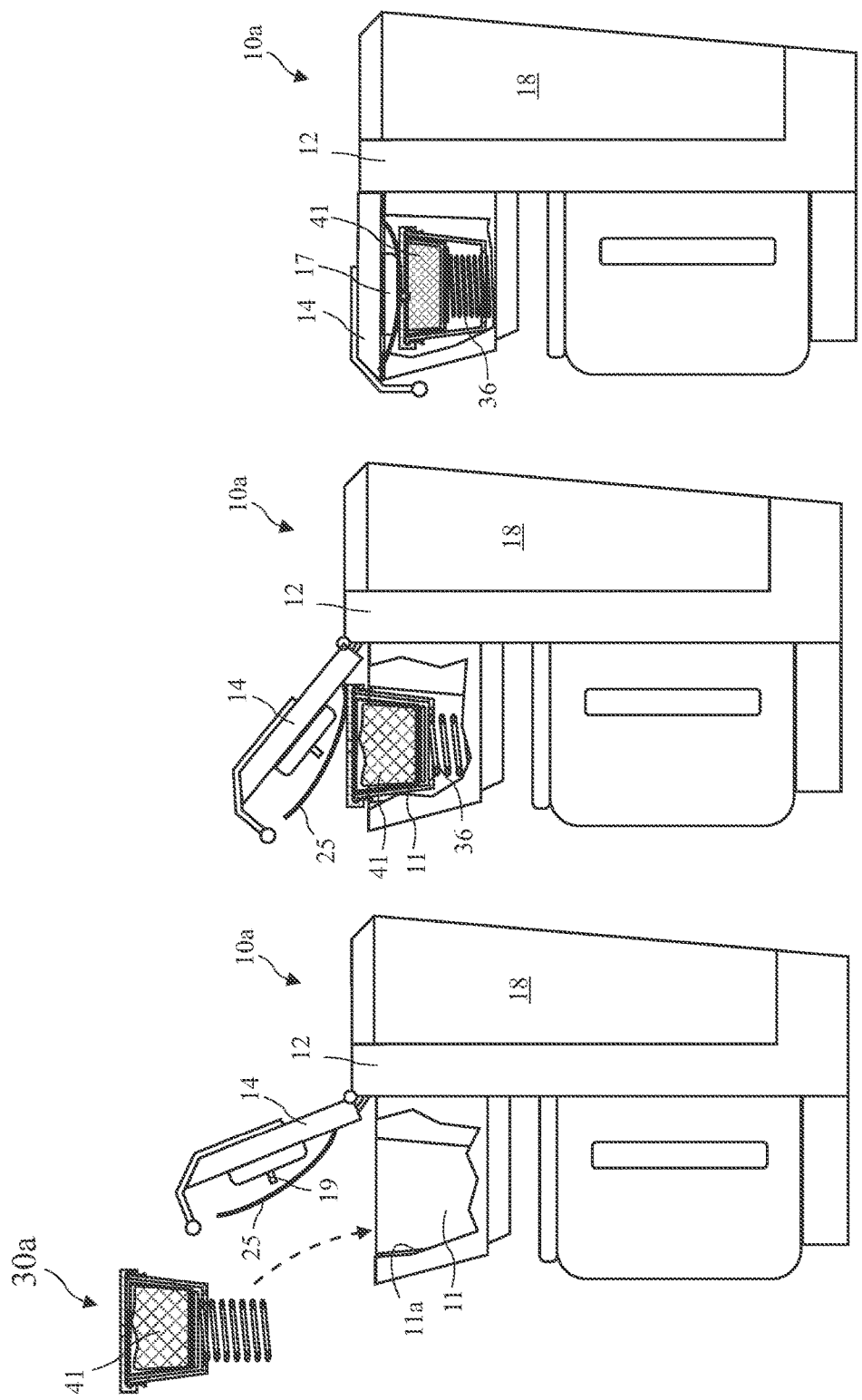

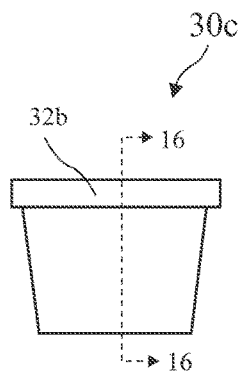
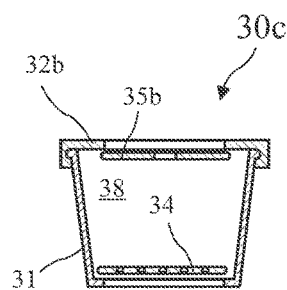
FIG. 15    FIG. 16
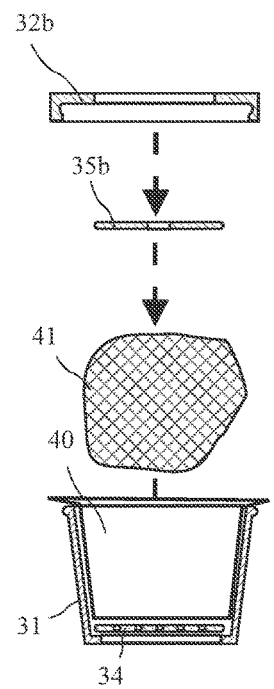
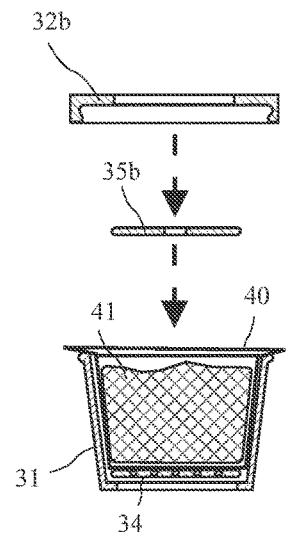
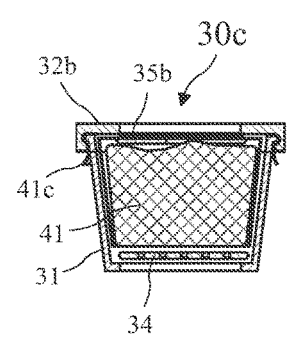
FIG. 17A    FIG. 17B    FIG. 17C

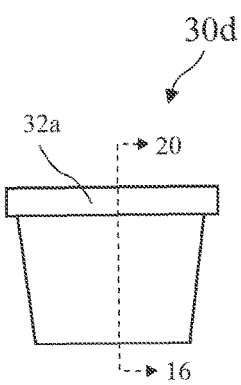
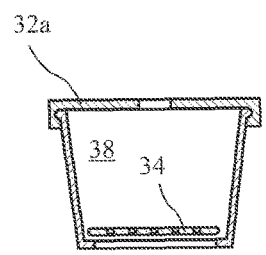
FIG. 19   FIG. 20
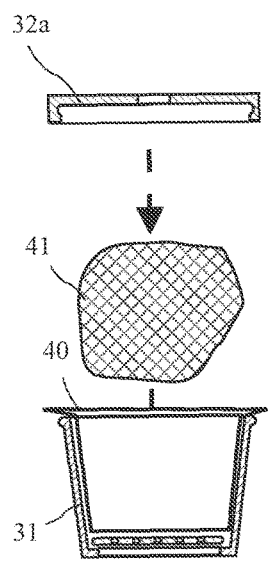
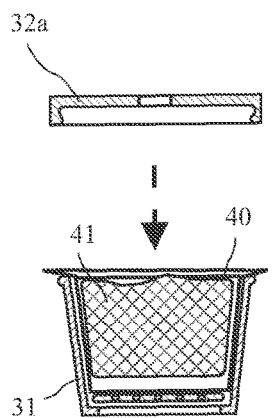
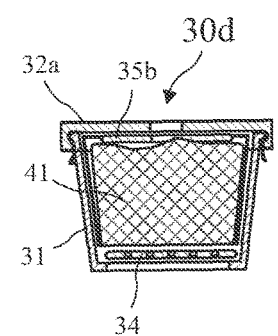
FIG. 21A   FIG. 21B   FIG. 21C

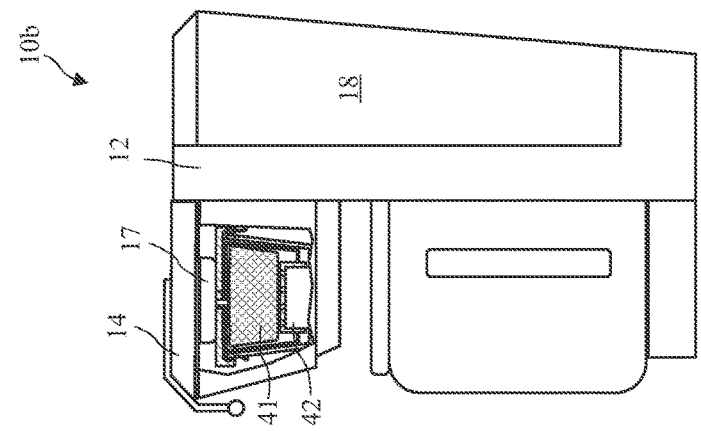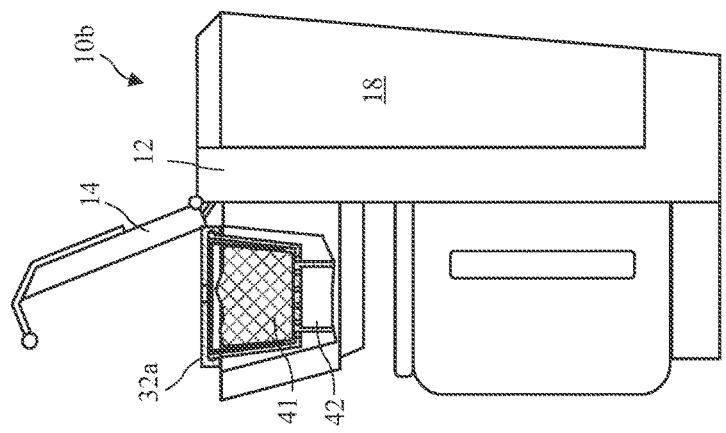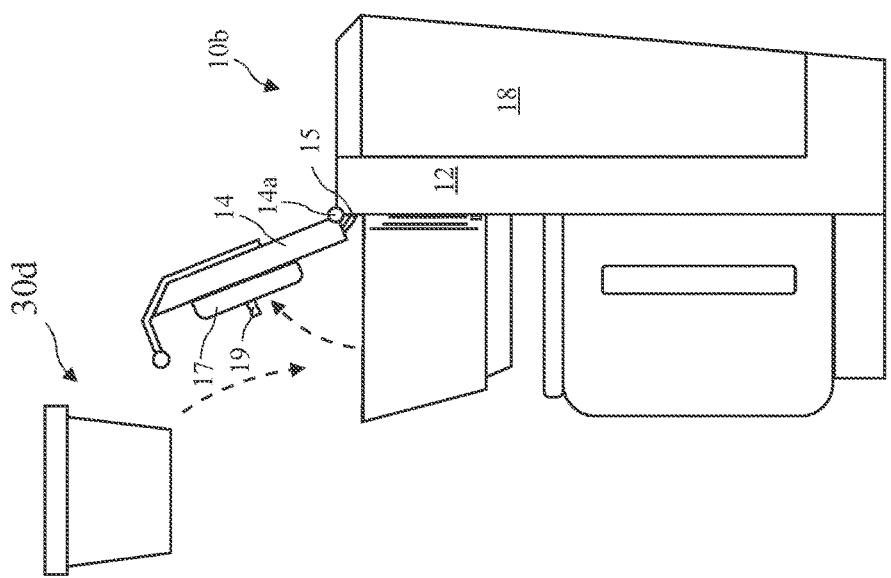

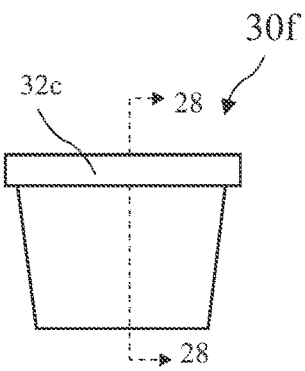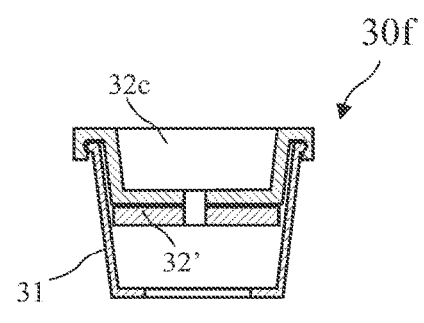
FIG. 27              FIG. 28
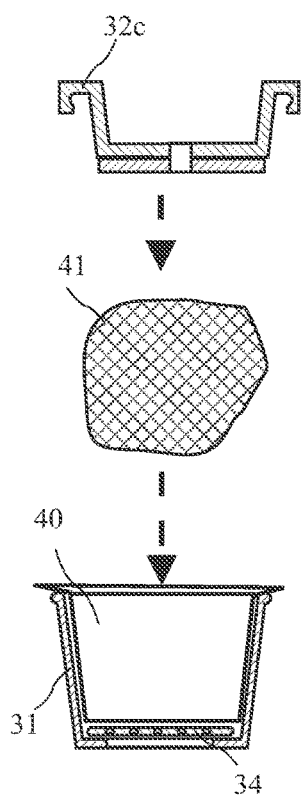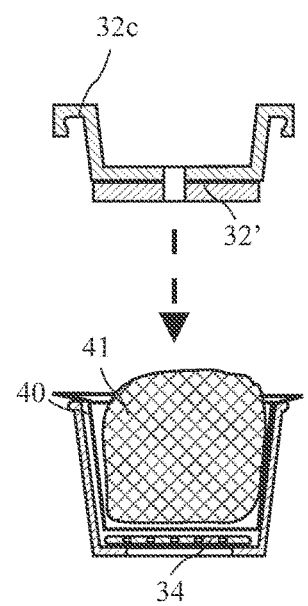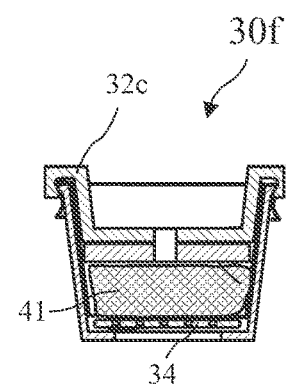
FIG. 29A          FIG. 29B          FIG. 29C

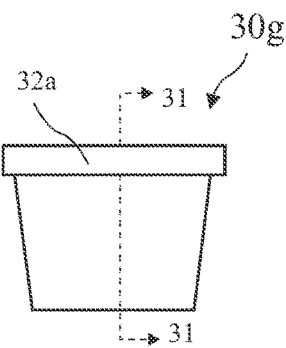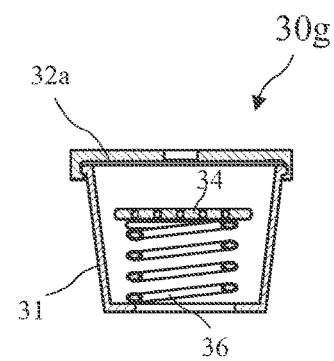
FIG. 30   FIG. 31
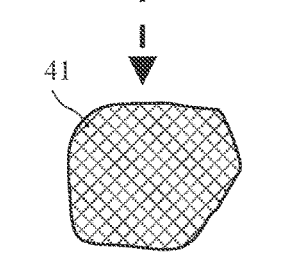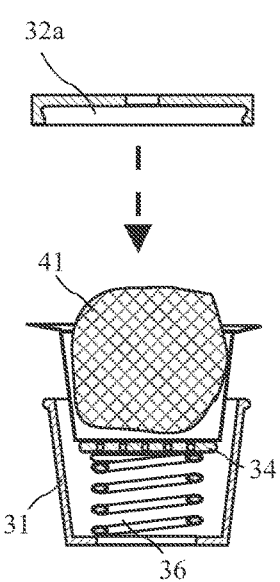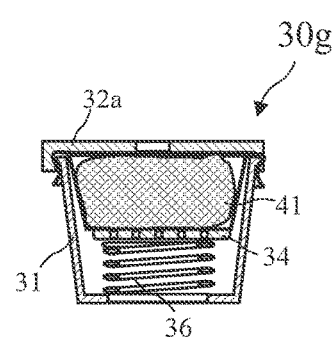
FIG. 32A   FIG. 32B   FIG. 32C

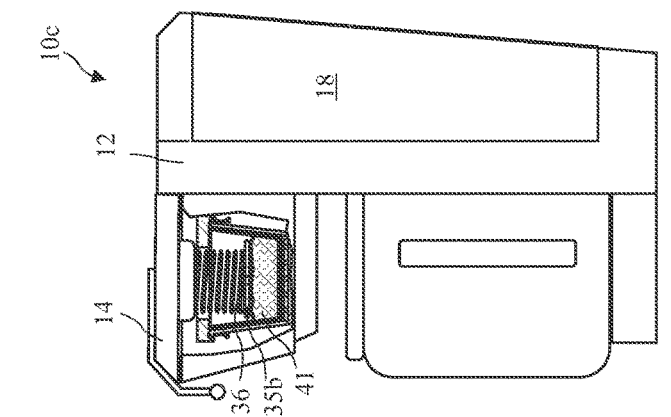
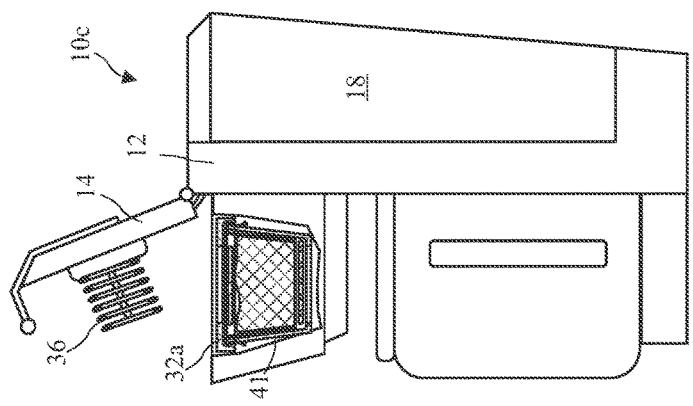
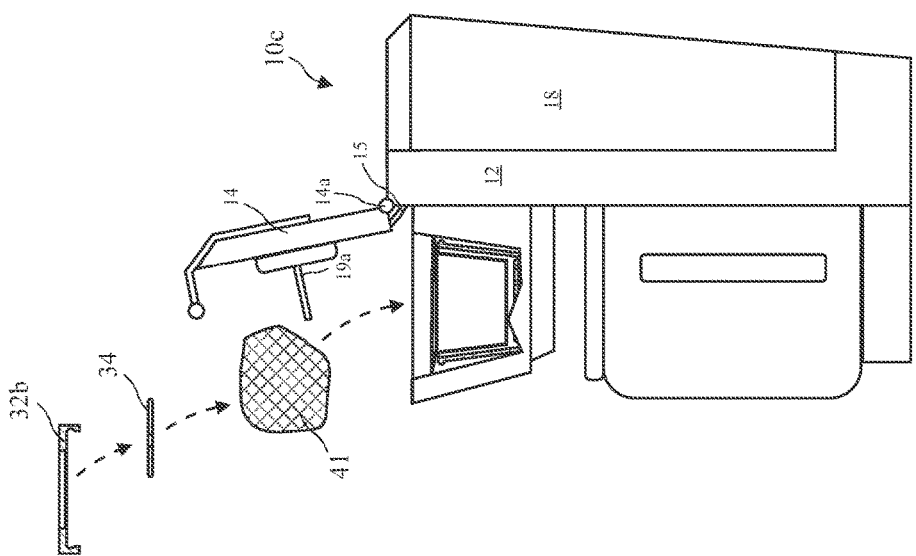
FIG. 38C
FIG. 38B
FIG. 38A

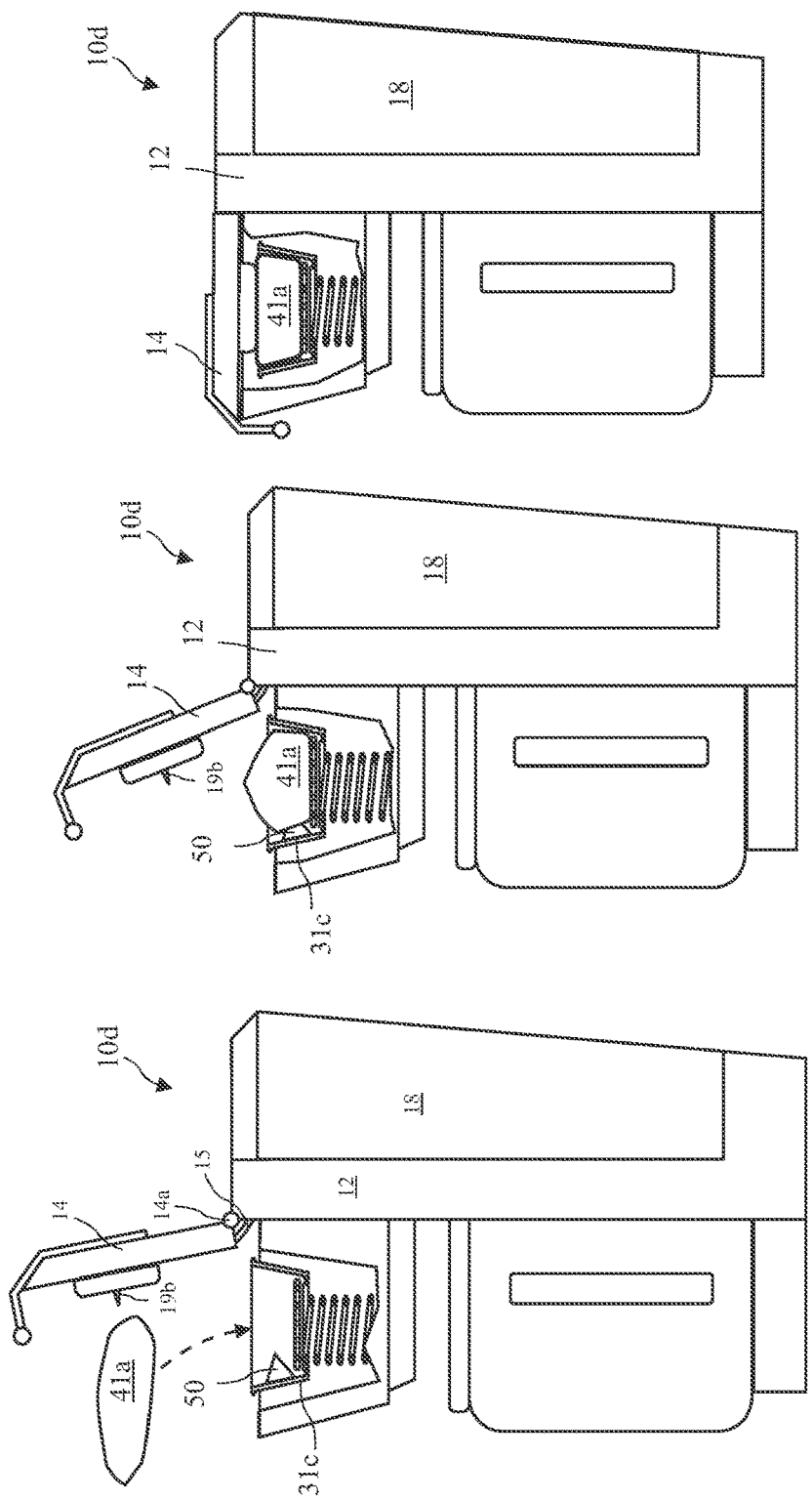

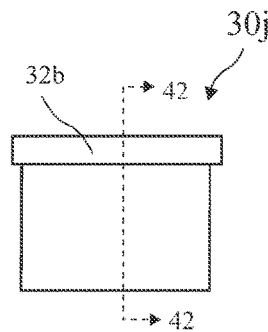
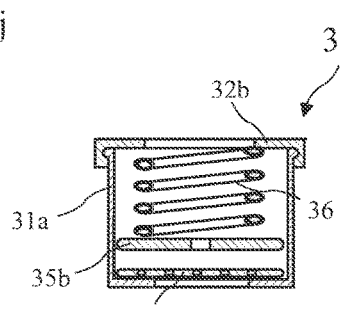
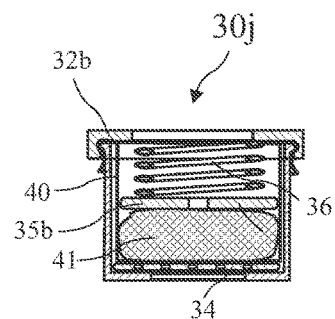
FIG. 41    FIG. 42    FIG. 43
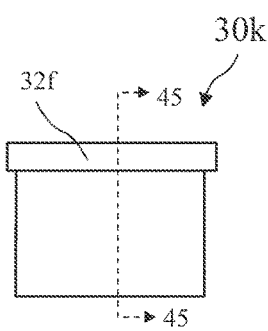
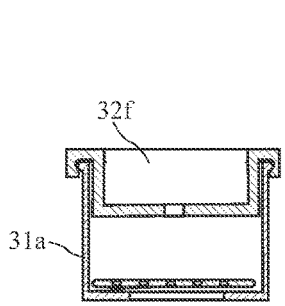
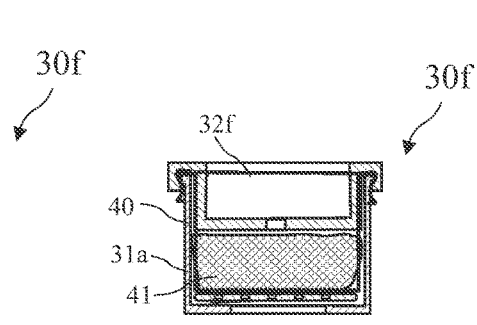
FIG. 44    FIG. 45    FIG. 46
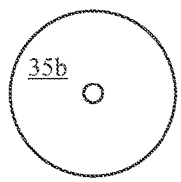
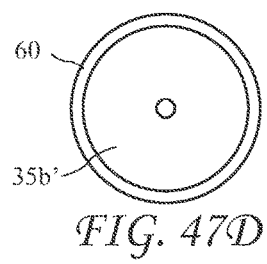
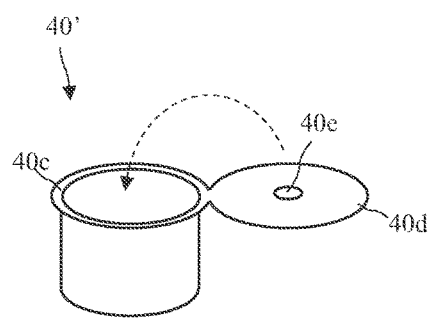
FIG. 47B    FIG. 47D    FIG. 48
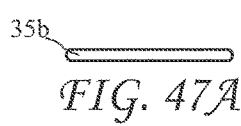
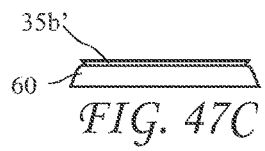
FIG. 47A    FIG. 47C

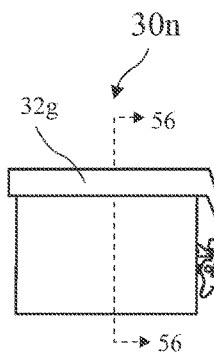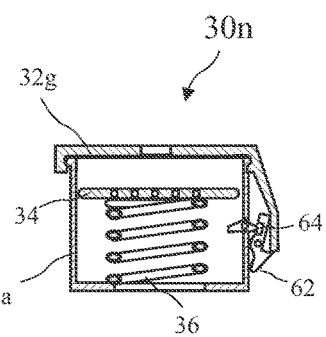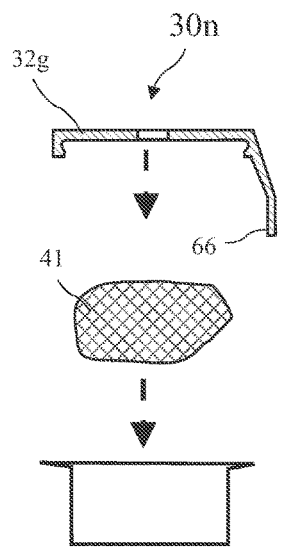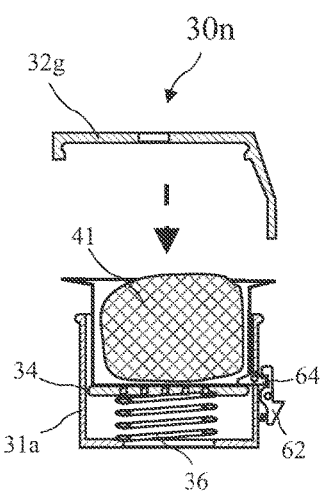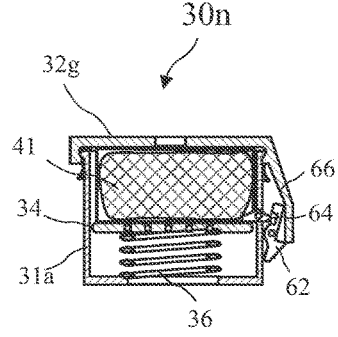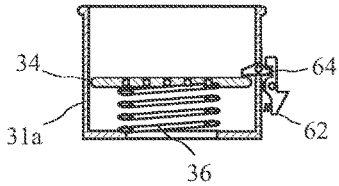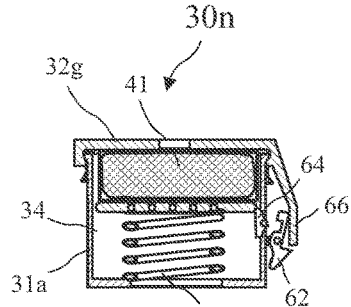

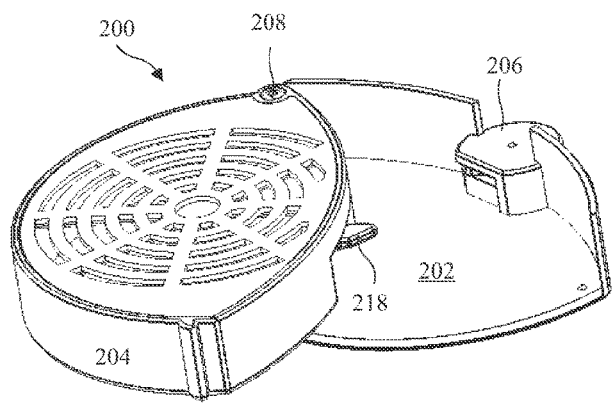
FIG. 70A
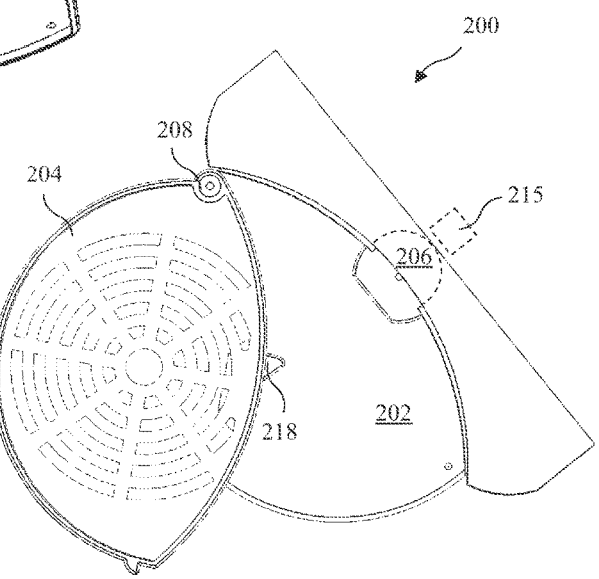
FIG. 70B
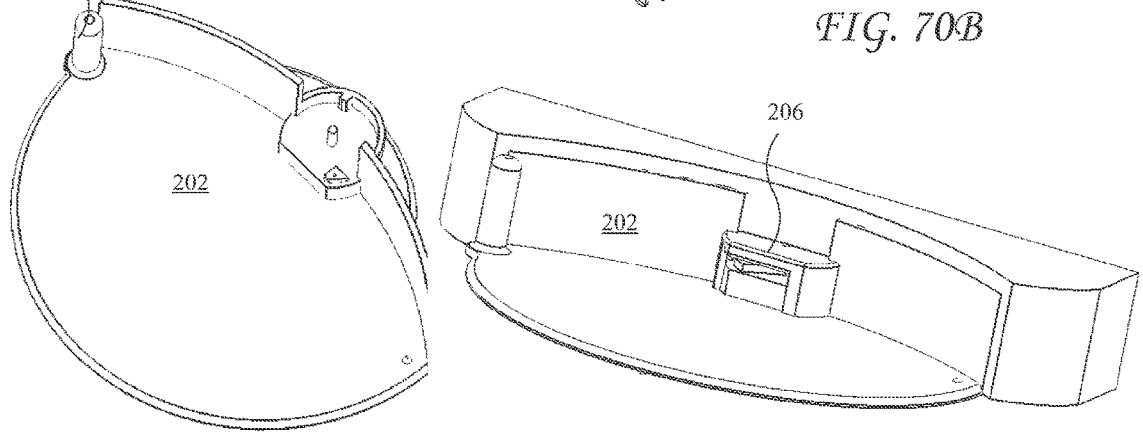
FIG. 71A
FIG. 71B

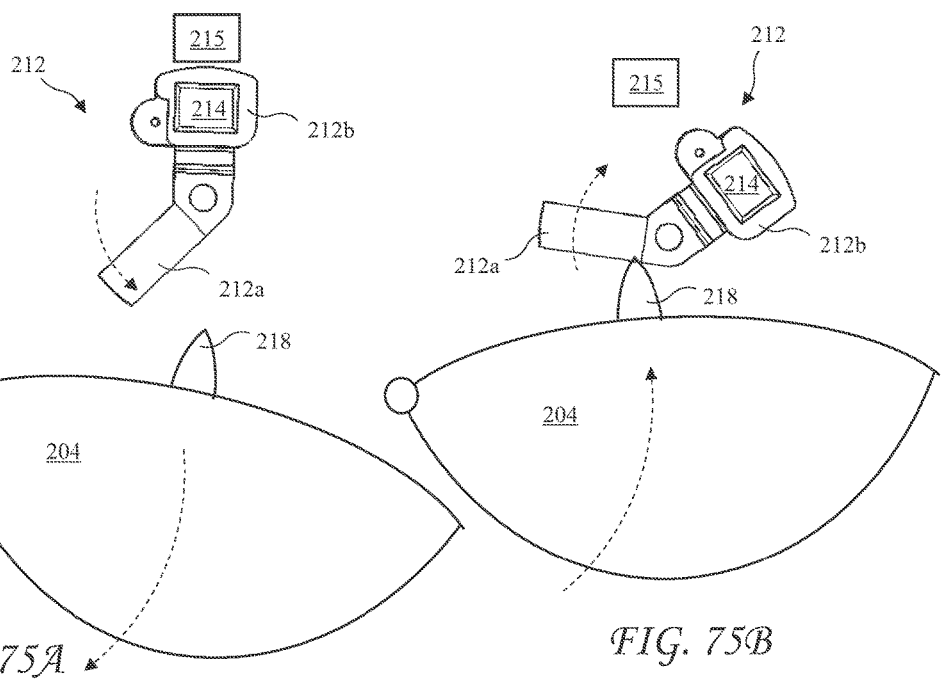
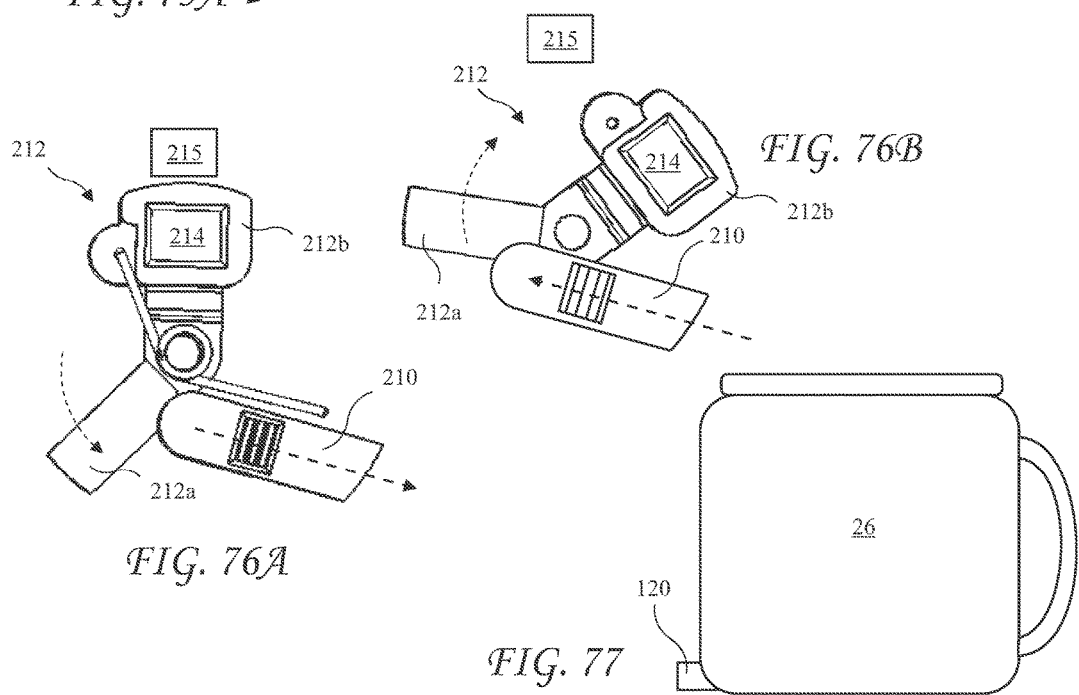
FIG. 75A
FIG. 75B
FIG. 76A
FIG. 76B
FIG. 77

COFFEE MAKER WITH MULTI AND SINGLE CUP MODES

The present application is a Continuation in Part of U.S. patent application Ser. No. 12/610,181 filed Oct. 30, 2009, and U.S. patent application Ser. No. 12/620,584 filed Nov. 17, 2009, and U.S. patent application Ser. No. 12/762,262 filed Apr. 16, 2010, which applications are incorporated in their entirety herein by reference.

BACKGROUND OF THE INVENTION

The present invention relates to coffee makers and in particular to a coffee maker utilizing a stream of hot water through tamped ground coffee.

Coffee is generally prepared in a coffee maker by measuring an amount of ground coffee into a coffee filter, closing a lid over the ground coffee, and providing a stream of hot water through the loosely packed ground coffee. Unfortunately, water passes freely through the loosely packed ground coffee and does not obtain the full flavor which might otherwise be obtained.

U.S. patent application Ser. No. 11/777,831 filed Jul. 13, 2007 for "Pod Adapter System for Single Service Beverage Brewers" by the present applicant overcomes this problem using prepackage coffee in closed filter paper commonly called a pod, and inserting the closed pod into a pod holder including a tamping spring and bottom tamper for tamping the pod between the bottom tamper and a coffee holder lid. While the pod adapter of the '831 application works well for coffee pods, it does not allow the simple use of bulk ground coffee not prepackage in the closed pod.

U.S. patent application Ser. No. 12/610,181 filed Oct. 30, 2009 for "Self Tamping Coffee Holder" filed by the present applicant further discloses a coffee making apparatus and methods which provide a tamped packing of loose ground coffee thereby obtaining richer flavor. The Coffee maker includes a reservoir, a pump, a heater, and a check valve. Coffee grounds are first loosely deposited in a coffee holder and then tamped onto a compacted state. The coffee holder may be filled loosely with the coffee and then placed into the coffee making apparatus and compacted, or the coffee may be compacted in the coffee holder and then the coffee holder placed into the coffee making apparatus. The compacting may be by a spring or by a resilient solid material and may be part of the coffee holder or part of the coffee making apparatus.

Further, U.S. patent application Ser. No. 12/620,584 filed Nov. 17, 2009 for "Self Tamping Coffee Holder" filed by the present applicant further discloses a self-tamping coffee holder which tamps loose ground coffee obtaining richer flavor. The coffee holder includes a holder base and a holder cap. Coffee is loosely deposited in the coffee holder and the holder cap is attached to the holder base. An internal filter chamber holds the coffee and allows tamping of the coffee into a compacted state. The filter chamber may be formed by a fixed filter or by a removable filter constructed of filter paper, nylon mesh, metal mesh, or any material capable of holding the coffee while allowing a flow of heated water through the coffee. The tamping may be by a spring or by a resilient solid material attached to the coffee holder and may push the coffee down inside the filter or push the filter and the coffee up against the holder lid.

While the 831, 181, and 584 patents successfully address tamping loose coffee, the coffee maker generally prepares a fixed quantity of coffee, either several cups of coffee to fill a carafe, or a single cup. Most users do not have space for multiple coffee makers so must pick between the multi-cup and single cup coffee makers.

BRIEF SUMMARY OF THE INVENTION

The present invention addresses the above and other needs by providing a multimode coffee maker which facilitates switching between a carafe mode and a single cup mode. The coffee maker includes switches for selecting the amount of coffee brewed, a drip valve normally closed to prevent dripping and opened by insertion of a carafe or a single cup adapter into the coffee maker, and a hot plate for maintaining the temperature of coffee in the carafe, the hot plate independent switchable on and off. A single cup adapter includes a swing-out platform which cooperates with a multimode coffee maker to switch from a small size to a large size brewed drink when the platform is moved to provide space for a large cup.

In accordance with one aspect of the invention, there is provided a single and multi-cup coffee maker having a switch actuated by the single cup adapter to provide a smaller or a larger portion of brewed drink. The single cup adapter may actuate the switch by either positioning the adapter with the coffee maker, or a swing away single cup support. The switch may be actuated by cooperation of a probe and socket, or magnetically actuated.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A is a front view of a coffee maker according to the present invention.

FIG. 1B is a side view of the coffee maker according to the present invention.

FIG. 1C is a top view of the coffee maker according to the present invention.

FIG. 3 is a side view of a first coffee holder according to the present invention.

FIG. 4 is a cross-sectional side view of the first coffee holder according to the present invention taken along line 4-4 of FIG. 3.

FIG. 5A is a cross-sectional side view of the first coffee holder according to the present invention taken along line 4-4 of FIG. 3 showing an empty coffee holder with the tamping spring and the bottom tamper according to the present invention.

FIG. 5B is a cross-sectional side view of the first coffee holder according to the present invention taken along line 4-4 of FIG. 3 showing the coffee holder with the tamping spring and bottom tamper, a portion of coffee, and the holder lid ready to attach to a holder body according to the present invention.

FIG. 5C is a cross-sectional side view of the first coffee holder according to the present invention taken along line 4-4 of FIG. 3 showing the coffee holder with the tamping spring and bottom tamper, the portion of coffee in the coffee holder, and the holder lid ready to attach to the holder body according to the present invention.

FIG. 5D is a cross-sectional side view of the first coffee holder according to the present invention taken along line 4-4 of FIG. 3 showing the coffee holder with the tamping spring and bottom tamper. The portion of coffee in the coffee holder, and the holder lid attached to the coffee holder body, according to the present invention.

FIG. 6 is a top view of the first holder lid.

FIG. 7A is a side view of a filter paper cup according to the present invention.

FIG. 7B is a top view of the filter paper cup according to the present invention.

FIG. 7C is a second embodiment of the filter paper cup with a lid.

FIG. 8A shows the first coffee holder ready for insertion into the coffee maker.

FIG. 8B shows the first coffee holder inserted into the coffee maker before tamping the coffee.

FIG. 8C shows the first coffee holder inserted into the coffee maker after tamping the coffee.

FIG. 15 is a side view of a third coffee holder according to the present invention.

FIG. 16 is a cross-sectional side view of the third coffee holder according to the present invention taken along line 16-16 of FIG. 15.

FIG. 17A is a cross-sectional side view of the third coffee holder according to the present invention taken along line 16-16 of FIG. 15 showing the portion of coffee above the coffee holder and the top tamper and the holder lid ready to attach to the coffee holder, according to the present invention.

FIG. 17B is a cross-sectional side view of the third coffee holder according to the present invention taken along line 16-16 of FIG. 15 showing the portion of coffee in the coffee holder, and the top tamper and the holder lid ready to attach to the coffee holder, according to the present invention.

FIG. 17C is a cross-sectional side view of the third coffee holder according to the present invention taken along line 16-16 of FIG. 15 showing the portion of coffee in the coffee holder, and the bottom tamper, the top tamper, and the holder lid attached to the coffee holder, according to the present invention.

FIG. 19 is a side view of a fourth coffee holder according to the present invention.

FIG. 20 is a cross-sectional side view of the fourth coffee holder according to the present invention taken along line 20-20 of FIG. 19.

FIG. 21A is a cross-sectional side view of the fourth coffee holder according to the present invention taken along line 20-20 of FIG. 19 showing the coffee holder with the bottom tamper, a portion of coffee, and the holder lid ready to attach, according to the present invention.

FIG. 21B is a cross-sectional side view of the fourth coffee holder according to the present invention taken along line 20-20 of FIG. 19 showing the coffee holder with the bottom tamper, a portion of coffee in the coffee holder, and the holder lid ready to attach, according to the present invention.

FIG. 21C is a cross-sectional side view of the fourth coffee holder according to the present invention taken along line 20-20 of FIG. 19 showing the coffee holder with the bottom tamper, a portion of coffee in the coffee holder, and the holder lid attached, according to the present invention.

FIG. 23A shows the fourth coffee holder ready for insertion into the coffee maker having a tamping block according to the present invention.

FIG. 23B shows the fourth coffee holder inserted into the coffee maker having the tamping block before tamping the coffee.

FIG. 23C shows the fourth coffee holder inserted into the coffee maker having the tamping block after tamping the coffee.

FIG. 27 is a side view of a sixth coffee holder according to the present invention.

FIG. 28 is a cross-sectional side view of the sixth coffee holder according to the present invention taken along line 28-28 of FIG. 27.

FIG. 29A is a cross-sectional side view of the sixth coffee holder according to the present invention taken along line 28-28 of FIG. 27 showing the portion of coffee above the coffee holder, and the holder lid ready to attach to the holder body, according to the present invention.

FIG. 29B is a cross-sectional side view of the sixth coffee holder according to the present invention taken along line 28-28 of FIG. 27 showing the portion of coffee in the coffee holder, and the holder lid ready to attach to the holder body, according to the present invention.

FIG. 29C is a cross-sectional side view of the sixth coffee holder according to the present invention taken along line 28-28 of FIG. 27 showing the portion of coffee in the coffee holder, and the holder lid attached and tamping the coffee, according to the present invention.

FIG. 30 is a side view of a seventh coffee holder according to the present invention.

FIG. 31 is a cross-sectional side view of the seventh coffee holder according to the present invention taken along line 31-31 of FIG. 30.

FIG. 32A is a cross-sectional side view of the seventh coffee holder according to the present invention taken along line 31-31 of FIG. 30 showing the portion of coffee above the coffee holder, and the holder lid ready to attach to the holder body, according to the present invention.

FIG. 32B is a cross-sectional side view of the seventh coffee holder according to the present invention taken along line 31-31 of FIG. 30 showing the portion of coffee in the coffee holder, and the holder lid ready to attach to the holder body, according to the present invention.

FIG. 32C is a cross-sectional side view of the seventh coffee holder according to the present invention taken along line 31-31 of FIG. 30 showing the portion of coffee in the coffee holder, and the holder lid attached to the holder body and the coffee tamped between the bottom tamper and spring and the holder lid, according to the present invention.

FIG. 38A shows a third coffee maker having a coffee holder for receiving a portion of coffee and tamping spring attached to the coffee maker lid according to the present invention for tamping the coffee when the coffee maker lid is closed.

FIG. 38B shows the third coffee maker with the coffee holder holding the portion of untamped coffee according to the present invention for tamping the coffee when the coffee maker lid is closed.

FIG. 38C shows the third coffee maker with the coffee holder holding the portion of tamped coffee with the coffee maker lid closed to push the tamping spring into the coffee holder for tamping the coffee according to the present invention.

FIG. 39A shows a fourth coffee maker having a coffee holder for receiving a packet containing untamped coffee, a knife for cutting the packet open, and tamping spring attached to the coffee maker lid according to the present invention for tamping the coffee when the coffee maker lid is closed.

FIG. 39B shows the fourth coffee maker with the coffee holder holding the packet of untamped coffee according to the present invention for tamping the coffee when the coffee maker lid is closed.

FIG. 39C shows the fourth coffee maker with the coffee holder holding the packet of tamped coffee with the coffee maker lid closed to push the tamping spring into the coffee holder for tamping the coffee according to the present invention.

FIG. 41 is a side view of a tenth coffee holder with straight walls according to the present invention.

FIG. 42 is a cross-sectional view of the tenth coffee holder taken along line 42-42 of FIG. 41 showing an empty coffee holder.

FIG. 43 is a cross-sectional view of the tenth coffee holder taken along line 42-42 of FIG. 41 showing a full and tamped coffee holder.

FIG. 44 is a side view of an eleventh coffee holder with straight walls according to the present invention.

FIG. 45 is a cross-sectional view of the eleventh coffee holder taken along line 45-45 of FIG. 44 showing an empty coffee holder.

FIG. 46 is a cross-sectional view of the eleventh coffee holder taken along line 45-45 of FIG. 41 showing a full and tamped coffee holder.

FIG. 47A is a side view of a top tamper.

FIG. 47B is a top view of the top tamper.

FIG. 47C is a side view of a top tamper with a seal according to the present invention.

FIG. 47D is a top view of the top tamper with a seal.

FIG. 48 is a perspective view of a filter paper cup with a folding cup lid.

FIG. 55 is a side view of a fourteenth coffee holder with a releaseable tamping latch according to the present invention.

FIG. 56 is a cross-sectional view of the fourteenth coffee holder taken along line 56-56 of FIG. 55 showing an empty coffee holder.

FIG. 57A is a cross-sectional view of the fourteenth coffee holder taken along line 56-56 of FIG. 55 showing a lid, coffee, a filter paper cup, above the base, and the coffee holder base, with the tamping latch retaining the bottom tamper.

FIG. 57B is a cross-sectional view of the fourteenth coffee holder taken along line 56-56 of FIG. 55 showing the lid, above the coffee and the filter paper cup resting in the coffee holder base, with the tamping latch retaining the bottom tamper.

FIG. 57C is a cross-sectional view of the fourteenth coffee holder taken along line 56-56 of FIG. 55 showing the lid, above the coffee and the filter paper cup resting in the coffee holder base, with the tamping latch released but just prior to tamping.

FIG. 57D is a cross-sectional view of the fourteenth coffee holder taken along line 56-56 of FIG. 55 showing the lid attached to the base with the coffee and the filter paper cup residing in the coffee holder base with tamping latches released and the coffee tamped.

FIG. 63A is a side view of a filter cup according to the present invention.

FIG. 63B is a top view of the filter cup according to the present invention.

FIG. 64 is a side view of multimode coffee maker according to the present invention.

FIG. 65A is a front view of the multimode coffee maker according to the present invention with a carafe positioned for receiving a volume of coffee.

FIG. 65B is a side view of the multimode coffee maker according to the present invention with the carafe positioned for receiving a volume of coffee.

FIG. 66A is a front view of the multimode coffee maker according to the present invention with a coffee cup positioned for receiving a volume of coffee.

FIG. 66B is a side view of the multimode coffee maker according to the present invention with the coffee cup positioned for receiving a volume of coffee.

FIG. 67A is a front view of a single cup adapter according to the present invention.

FIG. 67B is a side view of the single cup adapter according to the present invention.

FIG. 67C is a top view of the single cup adapter according to the present invention.

FIG. 68 is a cross-sectional view of the single cup adapter according to the present invention taken along line 68-68 of FIG. 67A.

FIGS. 69A and 69B show side views of a multi-serving coffee holder and a side view of a single-serving coffee holder, according to the present invention.

FIG. 70A is a perspective view of a coffee maker mug tray according to the present invention.

FIG. 70B is a top view of the coffee maker mug tray according to the present invention.

FIG. 71A is a top perspective view of a mug tray base according to the present invention.

FIG. 71B is a front perspective view of the mug tray base according to the present invention.

Figure 72A:
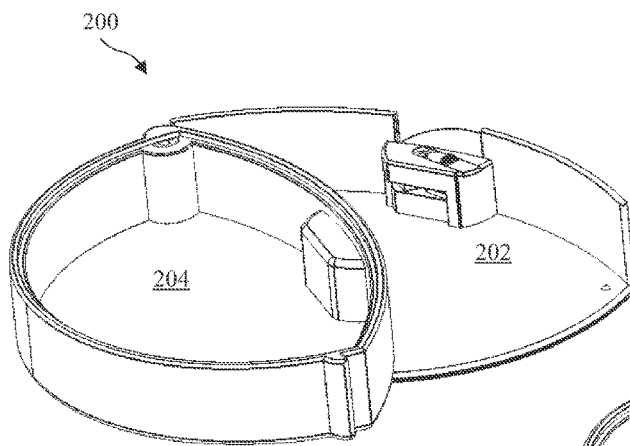

FIG. 72A is a perspective view of the coffee maker mug tray, with a grill removed, according to the present invention.

Figure 72B:
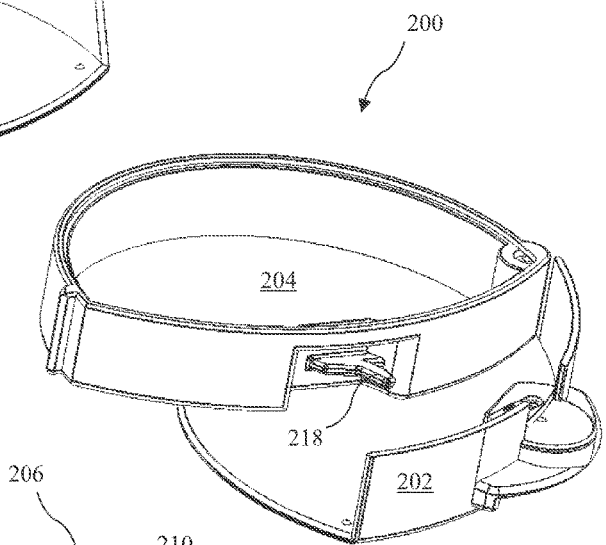

FIG. 72B is a second perspective view of the coffee maker mug tray, with the grill removed, according to the present invention.

Figure 73A:
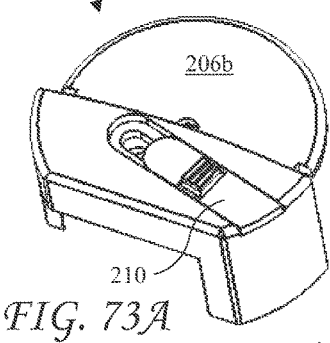

FIG. 73A shows a perspective top view of an actuating assembly of the coffee maker mug tray according to the present invention.

Figure 73B:
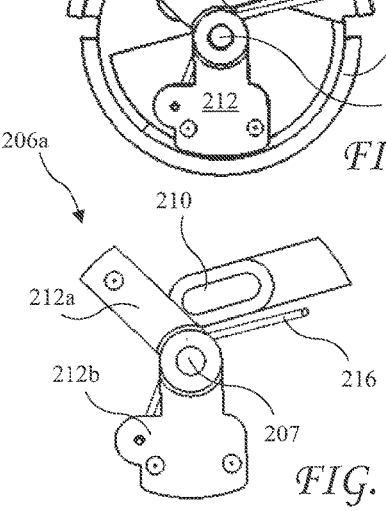

FIG. 73B shows a bottom view of the actuating assembly of the coffee maker mug tray according to the present invention.

Figure 74A:
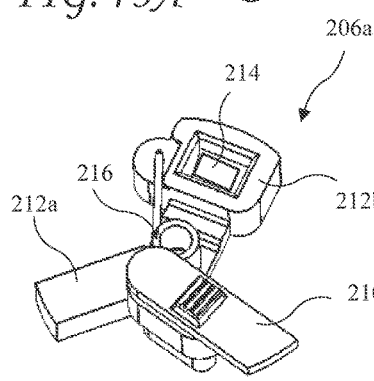

FIG. 74A shows a perspective top view of actuator elements of the actuating assembly of the coffee maker mug tray according to the present invention.

Figure 74B:
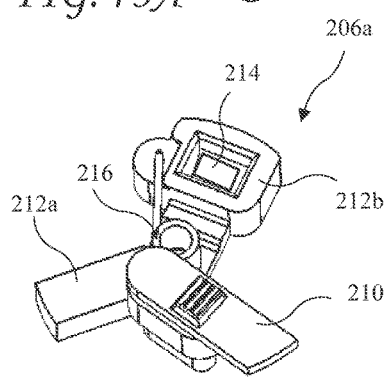

FIG. 74B shows a bottom view of the actuator elements of the actuating assembly of the coffee maker mug tray according to the present invention.

FIG. 75A show a top view of the pivoting actuator cooperating with a sensing element of the coffee maker according to the present invention.

FIG. 75B show a top view of the drip tray of the coffee maker mug tray pivoted into the coffee maker and the pivoting actuator pivoted away from the sensing element of the coffee maker according to the present invention.

FIG. 76A show a top view of the slide of the actuating assembly disengaged from the pivoting actuator and the pivoting actuator cooperating with a sensing element of the coffee maker according to the present invention.

FIG. 76B show a top view of the slide of the actuating assembly engaged with the pivoting actuator and the pivoting actuator pivoted away from the sensing element of the coffee maker according to the present invention.

FIG. 77 shows a carafe having a finger for cooperating with the coffee maker to change an operating mode according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A front view of a coffee 10 maker according to the present invention is shown in FIG. 1A a side view of the coffee maker 10 is shown in FIG. 1B, and a top view of the coffee maker 10 is shown in FIG. 1C. The coffee maker 10 includes a body 12, an opening lid 14, some lids handle 16, a water container 18, a display 20, controls 22, a platform 24 and a mouth 12a. A coffee pitcher 26 rests on the platform 24 inside the mouth 12a and has a pitcher lid 28. The coffee maker 10 provides a flow of hot water through coffee grounds to produce a coffee drink. The flow of water may be heated by one of any known means, for example, an electrical heating coil or a conductive coating on tubing carrying the water.

Figure 2A:
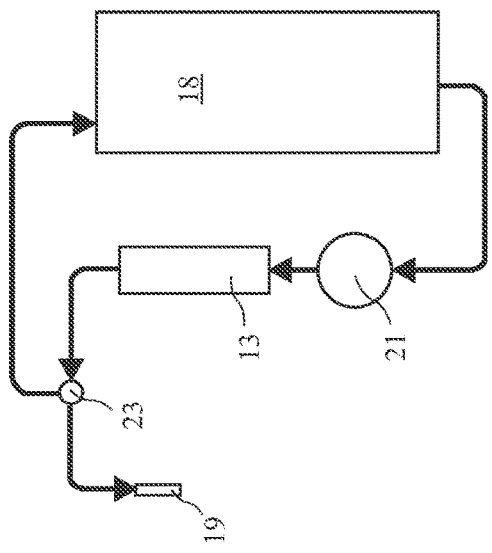
FIG. 2A is a functional diagram of the coffee maker.
Figure 2:
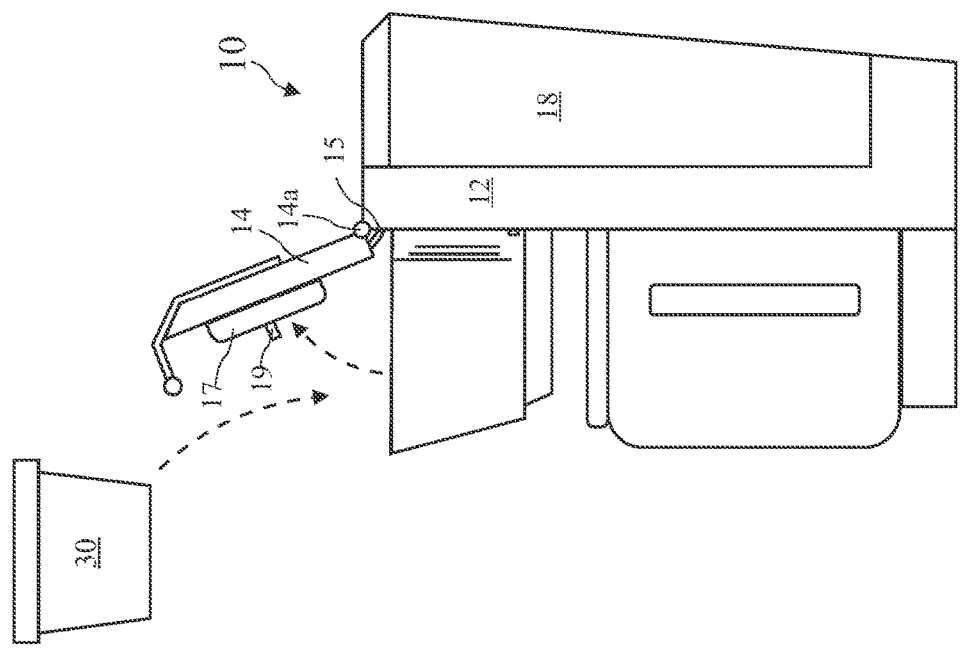
FIG. 2 is a side view of the coffee maker with an open lid allowing placement of a coffee holder according to the present invention inside the coffee maker.

A side view of the coffee maker 10 with an open lid 14 allowing placement of a coffee holder, 30 according to the present invention inside the coffee maker 10 is shown in FIG. 2. The lid 14 includes a lid hinge 14a and a water tube 15 carries heated water into the lid 14. A pad 17 resides on a bottom surface of the lid 14 and presses against the coffee holder 30 when the lid 14 is closed, and in cooperation with other means discloses hereafter, tamps coffee contained in the coffee holder 30. A nozzle 19 extending down from the closed lid 14 directs the flow of hot water into the coffee holder 30.

A functional diagram of the coffee maker 10 is shown in FIG. 2A. The preferred coffee maker 10 includes the water tank 18, water pump 21, a heater 13, check valve 23 and the nozzle 18. The pump 21 preferably provides at least one PSI water pressure. The water heater 13 may include a heating coil or a resistive coating or any other means for heating water. The check valve 23 limits the water pressure at the nozzle 19 by returning some of the water flow to the water tank 18. While a the water pump 21 is a preferred method for providing a flow of water to the nozzle 19, other methods include pressuring. The water in the water tank 18, and a coffee maker using any means to provide a forced flow of water is intending to come within the scope of the present invention.

A side view of a first coffee holder 30a according to the present invention is shown in FIG. 3 and a cross-sectional side view of the first coffee holder 30a including a holder body 31, a first holder lid 32a, a bottom tamper 34, and a tamping spring 36 according to the present invention taken along line 4-4 of FIG. 3 is shown in FIG. 4. A volume (or coffee holder interior) 38 is provided inside the coffee holder 30a to receive loose coffee 41. A passage 33 in the lid 32a is provided for the nozzle 19 (see FIG. 2).

Some cross-sectional side views of the first coffee holder 30a taken along line 4-4 of FIG. 3 showing an empty coffee holder 30a with the tamping spring 36 and the bottom tamper 34 ready for filling are shown in FIG. 5A. A cross-sectional side view of the first coffee holder 30a taken along line 4-4 of FIG. 3 showing the coffee holder 30a with the tamping spring 36 and bottom tamper 34, a portion of loose coffee 41, and the holder lid 32a ready to attach is shown in FIG. 5B. A cross-sectional side view of the first coffee holder 30a taken along line 4-4 of FIG. 3 showing the coffee holder 30a with the tamping spring 36 and bottom tamper 34, a portion of coffee in the volume 38, and the holder lid 32a ready to attach is shown in FIG. 5C. A cross-sectional side view of the first coffee holder 30a taken along line 4-4 of FIG. 3 showing the coffee holder 30a with the tamping spring 36 and bottom tamper 34, a portion of loose coffee 41 in the volume 38, and the holder lid 32a attached to the coffee holder 30a, is shown in FIG. 5D.

A top view of the first holder lid 32a showing the passage 33 provided for the nozzle 19 (see FIG. 2) is shown in FIG. 6.

A side view of a filter paper cup 40 according to the present invention is shown in FIG. 7A and a top view of the filter paper cup 40 is shown in FIG. 7B. The filter paper cup 40 includes a bottom 40b, sides 40a, and a rim 40c. The rim 40c rests on a top edge of the holder body 31 and is held between the holder cap and body when the cap is placed on the body, thereby preventing or restricting the escape of coffee 41 from the cup 40 when hot water flows into the coffee holder 30a.

A second embodiment of the filter paper cup 40' with a folding paper lid 40d is shown in FIG. 7C. The lid 40d of the filter paper cup 40' may be folded over the cup 40' after loose coffee is poured into the cup. The lid 40d preferably includes a perforation 40e centered on the lid 40d allowing the nozzle 19 to enter and/or inject the hot flow of water into the tamped coffee 41.

The filter cups may be made from several materials including filter paper, nylon mesh, steel mesh, or any material suitable for filtration.

The first coffee holder 30a is shown ready for insertion into a first coffee maker 10a in FIG. 8A, the first coffee holder 30a is shown inserted into the coffee maker 10 before tamping the coffee 41 in FIG. 8B, and the first coffee holder 30a is shown in the coffee maker 10 after tamping the coffee 41 in FIG. 8C. The coffee maker includes a cavity (or brewing chamber) 11 for accepting the coffee holder and has walls 11a for aligning the coffee holder in the coffee maker. When the lid 14 is closed, the pad 17 on the bottom of the lid 14 and/or arms 25 attached to the bottom of the lid 25, push the coffee holder 30a down over the tamping spring 36 and the coffee 41 is tamped between the lid 32a and the bottom tamper 34. The arms 25 push the coffee holder 30a down ahead of the nozzle 19 thereby seating the coffee holder 30a in the cavity 11 for alignment of the nozzle 10 with the passage 33 in the lid 32a.

Figure 9:
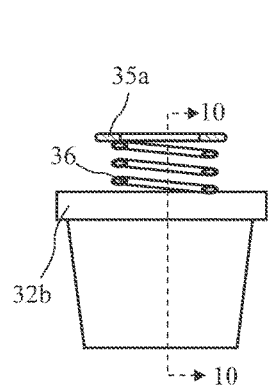
FIG. 9 is a side view of a second coffee holder according to the present invention.
Figure 10:
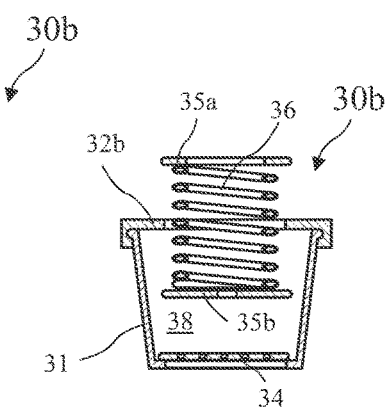
FIG. 10 is a cross-sectional side view of the second coffee holder according to the present invention taken along line 10-10 of FIG. 9.

A side view of a second coffee holder 30b according to the present invention is shown in FIG. 9 and a cross-sectional side view of the second coffee holder 30b taken along line 10-10 of FIG. 9 is shown in FIG. 10. The coffee holder 30b includes the holder body 31, a second holder lid 32b, a tamping spring 36, a spring washer 35a, and a top tamper 35b.

Figure 11A:
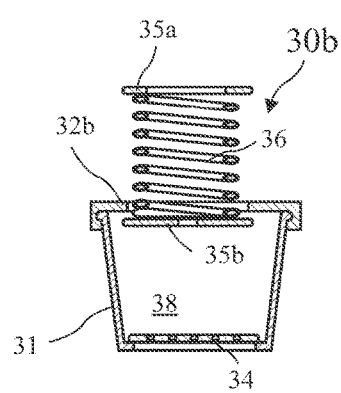
FIG. 11A is a cross-sectional side view of the second coffee holder according to the present invention taken along line 10-10 of FIG. 9 showing an empty coffee holder with the tamping spring and the top tamper according to the present invention.
Figure 11B:
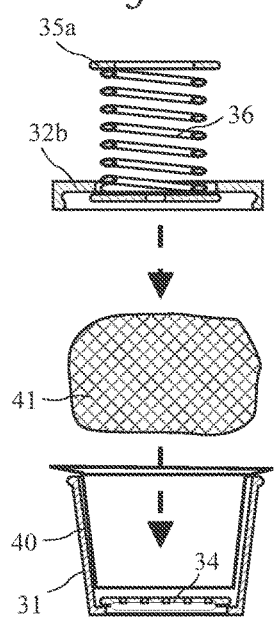
FIG. 11B is a cross-sectional side view of the second coffee holder according to the present invention taken along line 10-10 of FIG. 9 showing the coffee holder with the holder lid, tamping spring and top tamper, and a portion of coffee, ready to attach according to the present invention.
Figure 11C:
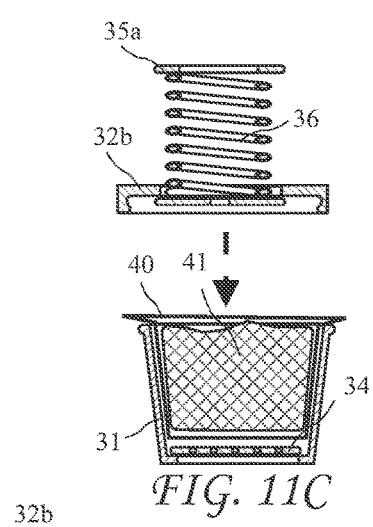
FIG. 11C is a cross-sectional side view of the second coffee holder according to the present invention taken along line 10-10 of FIG. 9 showing the portion of untamped coffee in the coffee holder, and the holder lid, tamping spring and top tamper, ready to attach to the holder base, according to the present invention.
Figure 11D:
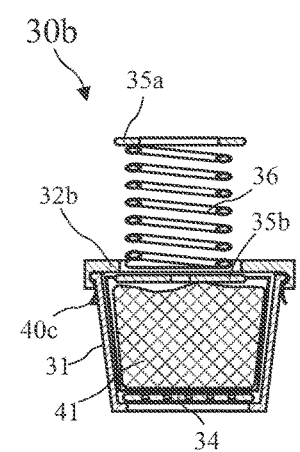
FIG. 11D is a cross-sectional side view of the second coffee holder according to the present invention taken along line 10-10 of FIG. 9 showing the portion of coffee in the coffee holder and the tamping spring, top tamper, and the holder lid attached to the coffee holder, according to the present invention.

A cross-sectional side view of the second coffee holder 30b took along line 10-10 of FIG. 9 showing an empty coffee holder 30b is shown in FIG. 11A. A cross-sectional side view of the second coffee holder 30b taken along line 10-10 of FIG. 9 showing the holder lid 32b and a loose portion of coffee 41 above the empty coffee holder 30b is shown in FIG. 11B. A cross-sectional side view of the second coffee holder 30b took along line 10-10 of FIG. 9 showing the holder lid 32b above the coffee holder 30b with the portion of loose coffee 41 in the coffee holder 32b is shown in FIG. 11C. A cross-sectional side view of the second coffee holder 32b taken along line 10-10 of FIG. 9 showing the coffee holder with the holder lid 32b attached to the coffee holder 30b and a portion of loose coffee 41 in the coffee holder 30b is shown in FIG. 11D. The tamping spring 36 extends upward out of the coffee holder 30b for tamping the loose coffee as disclosed hereafter.

Figure 12:
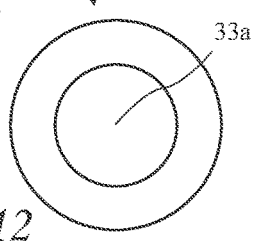
FIG. 12 is a top view of the second holder lid.

A top view of the second holder lid 32b is shown in FIG. 12. The holder lid 32b includes a larger passage 33a allowing passage of the tamping spring 36 through the holder lid 32b.

Figure 13:
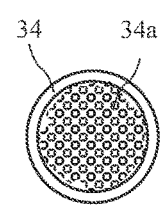
FIG. 13 is a top view of the bottom tamper.

A top view of the bottom tamper 34 is shown in FIG. 13. The bottom tamper 34 includes perforations 34a to allow coffee drink to pass through the bottom tamper 34.

Figure 14:
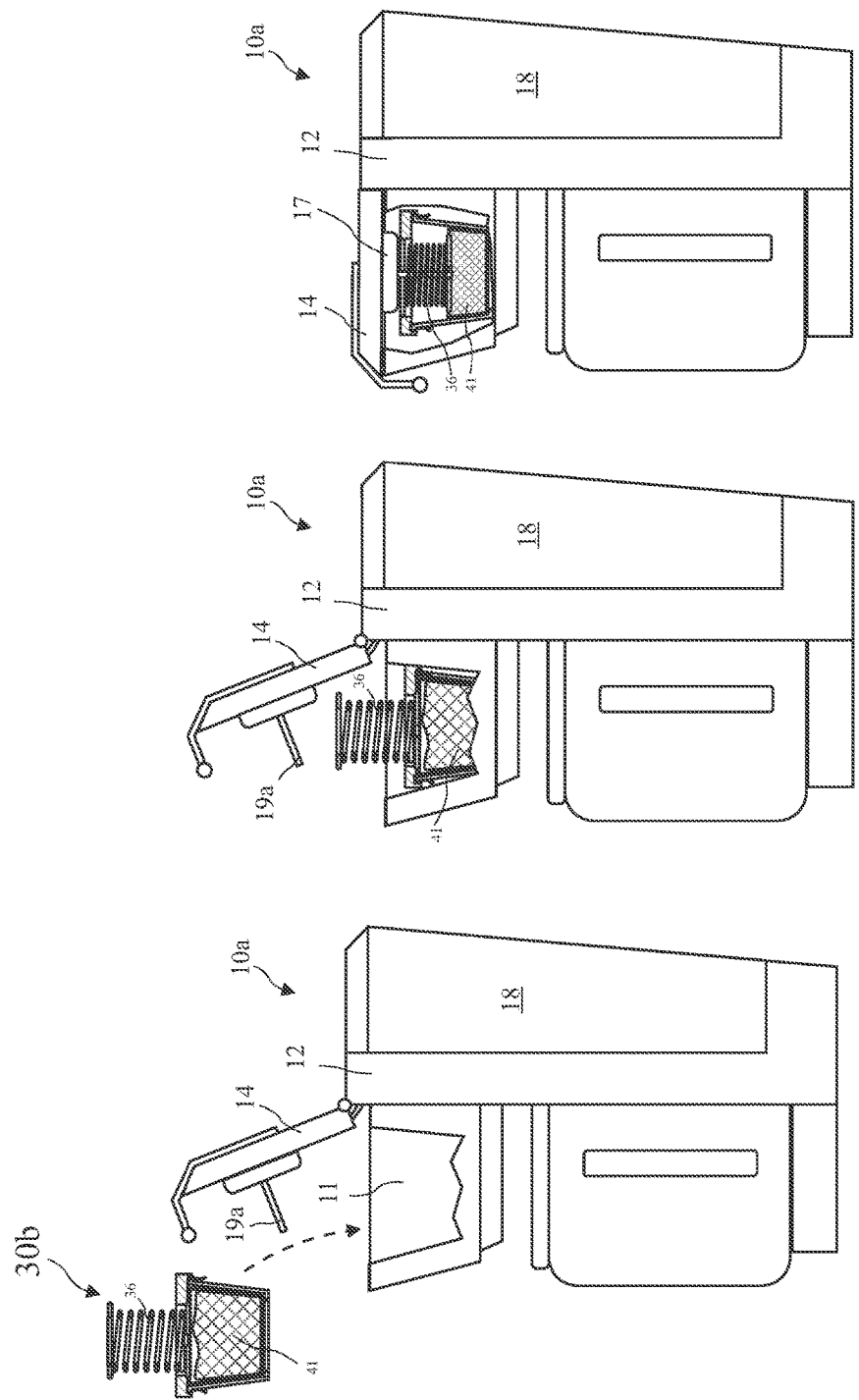
FIG. 14A shows the second coffee holder ready for insertion into the coffee maker.
FIG. 14B shows the second coffee holder inserted into the coffee maker before tamping the coffee.
FIG. 14C shows the second coffee holder inserted into the coffee maker after tamping the coffee.

The second coffee holder 30b is shown ready for insertion into the coffee maker 10 in FIG. 14A, the second coffee holder 30b is shown inserted into the coffee maker 10 before tamping the coffee 41 in FIG. 14B, and the second coffee holder 30b is shown in the coffee maker 10 after tamping the coffee 41 in FIG. 14C. The coffee maker 10 may include a long nozzle 19a to reach the top tamper 35b for "injection" of the heated water into the tamped coffee, but may also include the nozzle 19 and the heated water may pass through the coffee 41 under the pull of gravity.

A side view of a third coffee holder 30c according to the present invention is shown in FIG. 16 and a cross-sectional side view of the third coffee holder 30c taken along line 16-16 of FIG. 15 is shown in FIG. 16. The coffee holder 30c includes the holder body 31, the second holder lid 32b, the bottom tamper 34, and the top tamper 35b.

A cross-sectional side view of the third coffee holder 30c taken along line 16-16 of FIG. 15 showing the coffee holder 30c with the holder lid 32b, the top tamper 35b, and a portion of coffee, ready to attach to the holder 31, is shown in FIG. 17A. A cross-sectional side view of the third coffee holder taken along line 16-16 of FIG. 15 showing the coffee holder 30c with the holder lid 32b and the top tamper ready to attach, and a portion of coffee 41 in the coffee holder, is shown in FIG. 17B. A cross-sectional side view of the third coffee holder 30c taken along line 16-16 of FIG. 15 showing the coffee holder with the holder lid and the top tamper attached and a loose portion of coffee 41 in the coffee holder is shown in FIG. 17C. The coffee holder 30c is configured to use with a coffee make 10b (see FIGS. 18A-18C) including apparatus for entering the coffee holder for tamping the loose coffee 41.

Figure 18C:
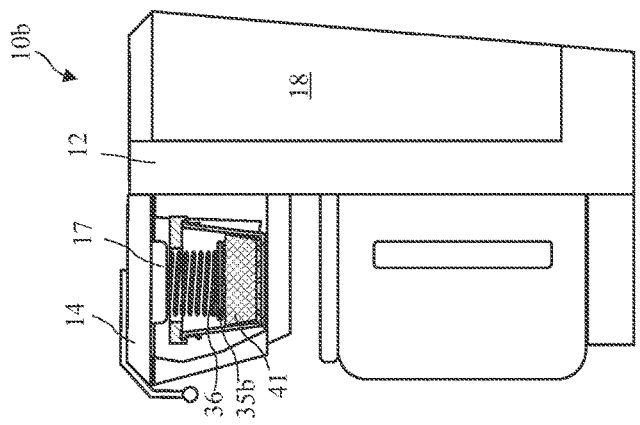
FIG. 18C shows the third coffee holder inserted into the coffee maker after tamping the coffee.
Figure 18B:
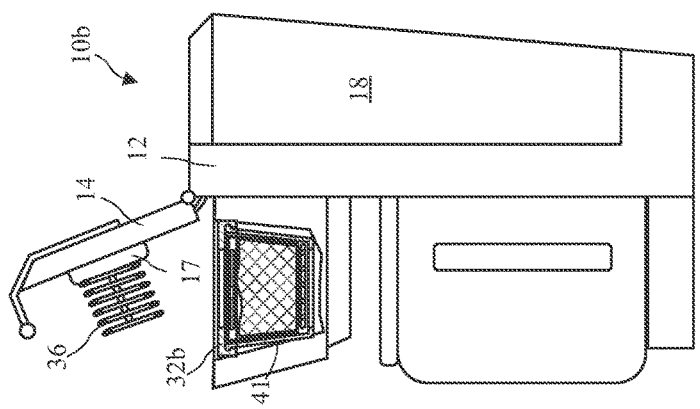
FIG. 18B shows the third coffee holder inserted into the coffee maker before tamping the coffee.
Figure 18A:
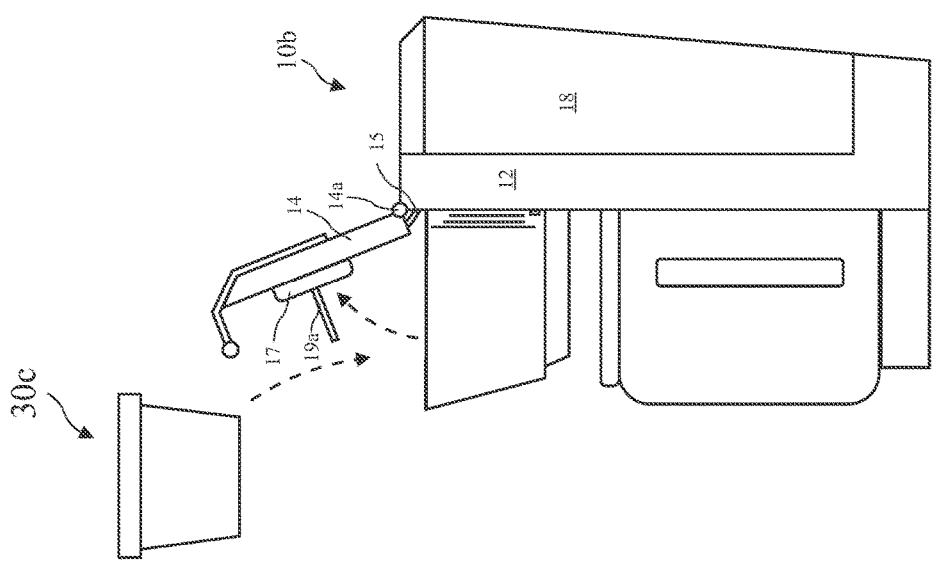
FIG. 18A shows the third coffee holder ready for insertion into a second coffee maker according to the present invention.

The third coffee holder 30c ready for insertion into a second coffee maker 10b in FIG. 18A, the third coffee holder 30c is shown residing in the coffee maker 10b before tamping the coffee 41 in FIG. 18B, and the third coffee holder 30c is shown residing in the coffee maker 10b after tamping the coffee 41 in FIG. 18C. The coffee maker 10b includes the tamping spring 36 attached to the pad 17 on the bottom of the lid 14. When the lid 14 is closed the tamping spring 36, enters the coffee holder 30c through the lid passage 33a (see FIG. 12) and pushes the top tamper 35b against the coffee 41 to tamp the coffee 41.

A side view of a fourth coffee holder 30d according to the present invention is shown in FIG. 19 and a cross-sectional side view of the fourth coffee holder 30d taken along line 20-20 of FIG. 19 is shown in FIG. 20. The coffee holder 30d includes the holder body 31, the first holder lid 32a, and the bottom tamper 34.

A cross-sectional side view of the fourth coffee holder 30d taken along line 20-20 of FIG. 19 showing the coffee holder with the bottom tamper 34, and a portion of coffee 41 and the holder lid ready to attach is shown in FIG. 21A. A cross-sectional side view of the fourth coffee holder 30d taken along line 20-20 of FIG. 19 showing the coffee holder 30*d* with the bottom tamper 34, the portion of coffee 41 in the coffee holder 30*d*, and the holder lid 32*a* ready to attach is shown in FIG. 21B. A cross-sectional side view of the fourth coffee holder 30*d* taken along line 20-20 of FIG. 19 showing the coffee holder 30*d* with the bottom tamper 34, a portion of coffee in the coffee holder 41, and the holder lid 32*a* is shown in FIG. 21C.

Figure 22C:
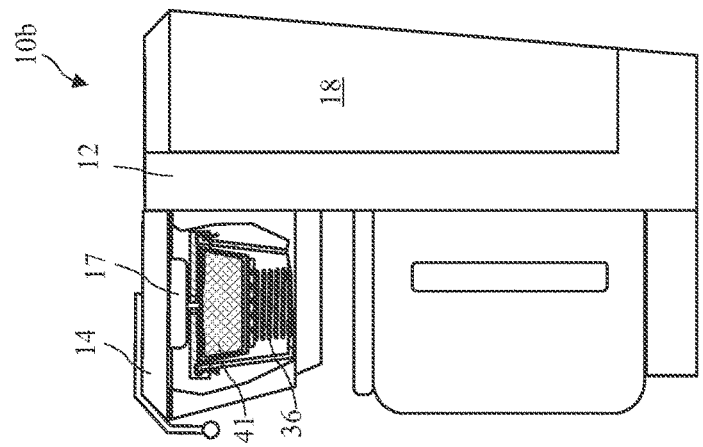
FIG. 22C shows the fourth coffee holder inserted into the coffee maker after tamping the coffee.
Figure 22B:
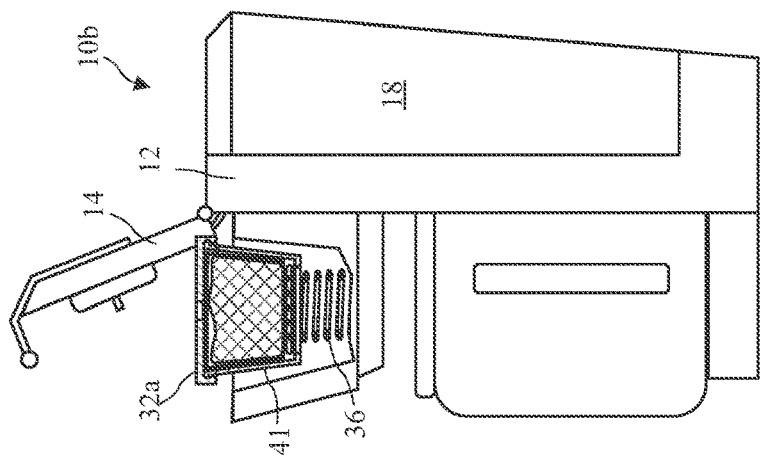
FIG. 22B shows the fourth coffee holder inserted into the coffee maker before tamping the coffee.
Figure 22A:
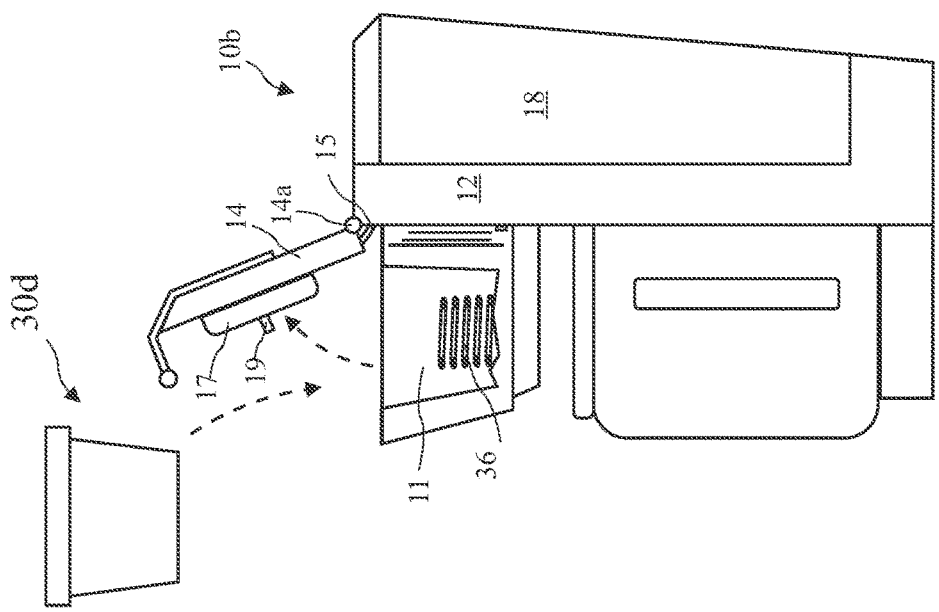
FIG. 22A shows the fourth coffee holder ready for insertion into the coffee maker.

The fourth coffee holder 30*d* ready for insertion into another embodiment of the second coffee maker 10*b* in FIG. 22A, the fourth coffee holder 30*d* is shown residing in the coffee maker 10*b* before tamping the coffee 41 in FIG. 22B, and the fourth coffee holder 30*d* is shown residing in the coffee maker 10*b* after tamping the coffee 41 in FIG. 22C. The coffee maker 10*b* may include the tamping spring 36 residing in the bottom of the coffee holder cavity 11. When the lid 14 is closed, the pad 17 pushed the coffee holder 30*d* down over the tamping spring 36 and the tamping spring 36 enters the coffee holder 30*c* through the bottom of the holder body 31 and pushes the bottom tamper 34 against the coffee 41 to tamp the coffee 41.

The fourth coffee holder 30*d* ready for insertion into another embodiment of the second coffee maker 10*b* in FIG. 23A, the fourth coffee holder 30*d* is shown residing in the coffee maker 10*b* before tamping the coffee 41 in FIG. 23B, and the fourth coffee holder 30*d* is shown residing in the coffee maker 10*b* after tamping the coffee 41 in FIG. 23C. The coffee maker 10*b* may include a resilient solid block 42 residing in the bottom of the coffee holder cavity 11. When the lid 14 is closed, the pad 17 pushed the coffee holder 30*d* down over the resilient solid block 42 and the resilient solid block 42 enters the coffee holder 30*c* through the bottom of the holder body 31 and pushes the bottom tamper 34 against the coffee 41 to tamp the coffee 41.

Figures 24, 25:
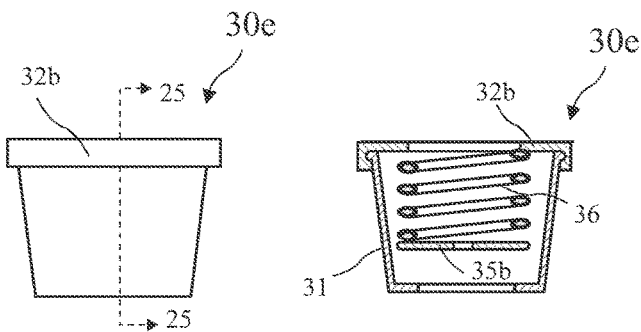
FIG. 24 is a side view of a fifth coffee holder according to the present invention.
FIG. 25 is a cross-sectional side view of the fifth coffee holder according to the present invention taken along line 25-25 of FIG. 24.

A side view of a fifth coffee holder 30*e* according to the present invention is shown in FIG. 24 and a cross-sectional side view of the fifth coffee holder 30*e* taken along line 25-25 of FIG. 24 is shown in FIG. 25. The fifth coffee holder 30*e* includes the holder body 31, the holder lid 32*b*, the tamping spring 36 and the top tamper 35*b* attached to the holder lid 32*a*.

Figures 26A, 26B, 26C:
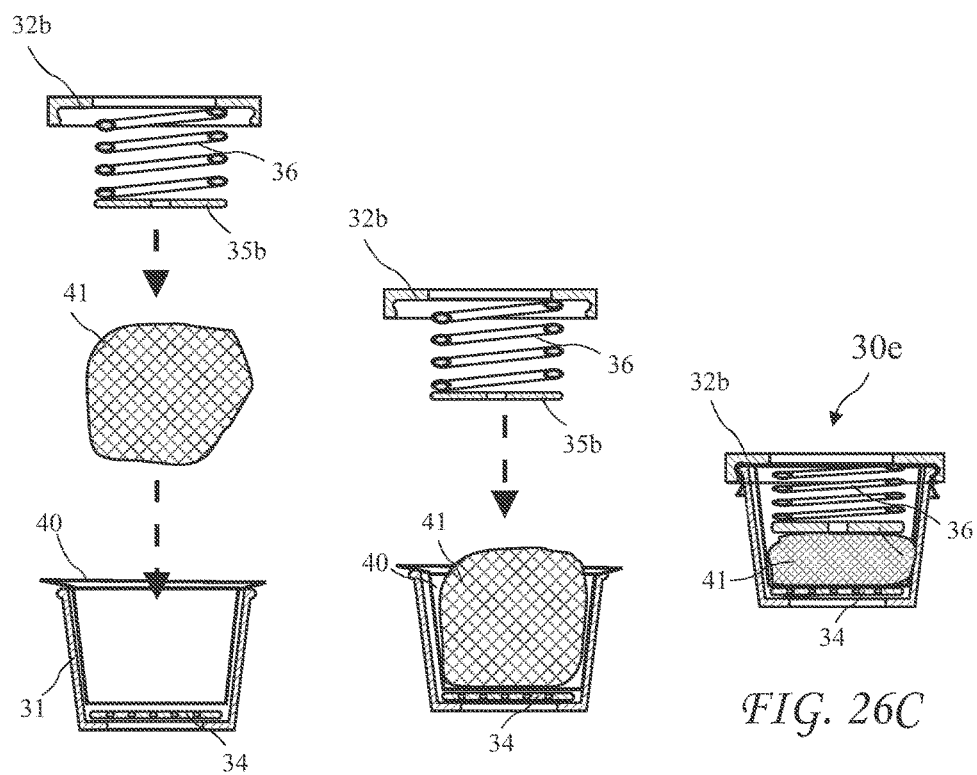
FIG. 26A is a cross-sectional side view of the fifth coffee holder according to the present invention taken along line 25-25 of FIG. 24 showing the portion of coffee above the coffee holder body, and the holder lid with the top tamper and tamping spring, ready to attach to the coffee holder body, according to the present invention.
FIG. 26B is a cross-sectional side view of the fifth coffee holder according to the present invention taken along line 25-25 of FIG. 24 showing the coffee holder with the portion of coffee in the coffee holder, and the holder lid with the top tamper and tamping spring ready to attach to the coffee holder body, according to the present invention.
FIG. 26C is a cross-sectional side view of the fifth coffee holder according to the present invention taken along line 25-25 of FIG. 24 showing the portion of coffee in the coffee holder, and the holder lid with the top tamper and tamping spring attached to the holder body, according to the present invention.

A cross-sectional side view of the fifth coffee holder 30*e* taken along line 25-25 of FIG. 24 showing the coffee holder 30*e* with a portion of coffee 41, and the holder lid 32*b* with the top tamper 35*b* and tamping spring 36 attached, above the holder body 31, is shown in FIG. 26A. A cross-sectional side view of the fifth coffee holder 30*e* taken along line 25-25 of FIG. 24 showing the coffee holder with the portion of coffee 41 in the coffee holder, and the holder lid 32*b* with the top tamper 35*b* and tamping spring 36 attached, above the holder body 31, is shown in FIG. 26B. A cross-sectional side view of the fifth coffee holder 30*e* taken along line 25-25 of FIG. 24 showing the coffee holder 30*e* with the portion of coffee 41 in the coffee holder 30*e*, and the holder lid 32*b* with the top tamper 35*b* and tamping spring 36 attached to the holder base 31 is shown in FIG. 26D. The tamping spring 36 and top tamper 35*b* tamp the coffee 41 to provide a tamped coffee when the holder lid 32*b* is attached to the holder base 31.

A side view of a sixth coffee holder 30*f* according to the present invention is shown in FIG. 27 and a cross-sectional side view of the sixth coffee holder 30*f* taken along line 28-28 of FIG. 27 is shown in FIG. 28. The sixth coffee holder 30*f* includes the holder body 31 and a third holder lid 32*c*. The third holder lid 32*c* includes a recessed portion 32' which reaches into the interior of the sixth coffee holder 30*f*. The recessed portion 32' is preferably a solid resilient material.

A cross-sectional side view of the sixth coffee holder 30*f* taken along line 28-28 of FIG. 27 showing the sixth coffee holder 30*f* with a portion of coffee 41, and the holder lid 32*c*, above the holder body 31, is shown in FIG. 29A. A cross-sectional side view of the sixth coffee holder 30*f* taken along line 28-28 of FIG. 27 showing the coffee holder with the portion of coffee 41 in the coffee holder, and the holder lid 32*c* above the holder body 31, is shown in FIG. 29B. A cross-sectional side view of the sixth coffee holder 30*f* along line 28-28 of FIG. 27 showing the sixth coffee holder 30*f* with the portion of coffee 41 in the coffee holder 30*e*, and the holder lid 32*e* attached to the holder base 31 is shown in FIG. 26D. A cushion 32' tamps the coffee 41 to provide a tamped coffee when the holder lid 32*e* is attached to the holder base 31. The cushion 32' is preferably made from a resilient material to cushion the tamping of the loose coffee.

A side view of a seventh coffee holder 30*g* according to the present invention is shown in FIG. 30 and a cross-sectional side view of the seventh coffee holder 30*g* taken along line 31-31 of FIG. 30 is shown in FIG. 31. The seventh coffee holder 30*g* includes the holder body 31, the holder lid 32*b*, the tamping spring 36, and the bottom tamper 34 inside the holder base 31.

A cross-sectional side view of the seventh coffee holder 30*g* taken along line 31-31 of FIG. 30 showing the seventh coffee holder 30*g* with a portion of coffee 41 and the holder lid 32*a* above the holder body 31, and with the bottom tamper 34 and tamping spring 36 inside the holder base 31, is shown in FIG. 26A. A cross-sectional side view of the seventh coffee holder 30*g* taken along line 31-31 of FIG. 30 showing the coffee holder with the portion of coffee 41 in the filter paper 40 in the holder base 31 resting on the bottom tamper 34 supported by the tamping spring 36, and the holder lid 32*a* above the holder body 31, is shown in FIG. 26B. A cross-sectional side view of the seventh coffee holder 30*g* taken along line 31-31 of FIG. 30 showing the seventh coffee holder 30*g* with the portion of coffee 41 in the coffee holder 30*e*, and the holder lid 32*a* attached to the holder base 31, is shown in FIG. 26D. The tamping spring 36 and bottom tamper 34 tamp the coffee 41 upward against the tamper lid 32*a* to provide a tamped coffee when the holder lid 32*a* is attached to the holder base 31.

Figure 33:
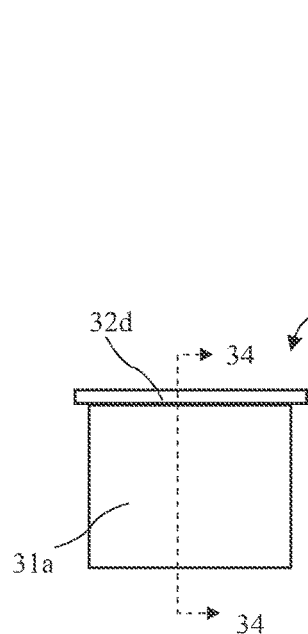
FIG. 33 is a side view of an eighth coffee holder according to the present invention.
Figure 34A:
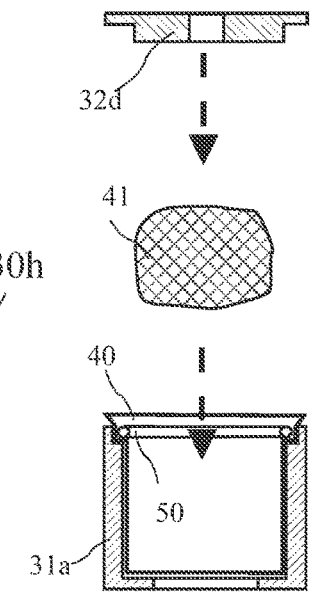
FIG. 34A is a cross-sectional side view of the eighth coffee holder taken along line 34-34 of FIG. 33 showing a portion of coffee for placing inside the coffee holder and the holder lid with an insertable portion and an O-Ring inside the coffee holder for sealing according to the present invention.
Figure 34B:
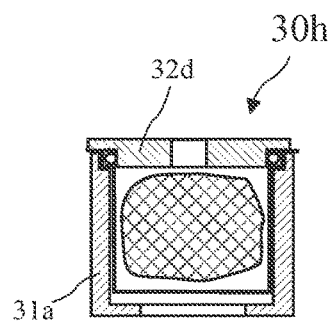
FIG. 34B is a cross-sectional side view of the eighth coffee holder taken along line 34-34 of FIG. 33 showing the portion of coffee inside the coffee holder and the holder lid with the insertable portion inserted into the coffee holder and cooperating with the O-Ring inside the coffee holder for sealing.

A side view of an eighth coffee holder 30*h* according to the present invention is shown in FIG. 33, a cross-sectional side view of the eighth coffee holder 30*h* taken along line 34-34 of FIG. 33 showing a portion of coffee 41 for placing inside the coffee holder and a fourth holder lid 32*d* with an insertable portion and an O-Ring 50 inside the coffee holder for sealing is shown in 34A, and a cross-sectional side view of the eighth coffee holder taken along line 34-34 of FIG. 33 showing the portion of coffee 41 inside the coffee holder 30*h* and the holder lid 32*d* with the insertable portion inserted into the coffee holder base 31*a* is shown in FIG. 34B. The filter paper 40 extends up above the O-ring 50 and the O-Ring 50 cooperates with the holder lid 32*d* to sandwich the top edge of the filter paper 40 for sealing the filter paper 40 to reduce or prevent the coffee 41 from escaping when the flow of hot water is provided to the coffee holder 30*h*. The holder base 31*a* is preferably cylindrical but may also be conical in shape.

Figure 35:
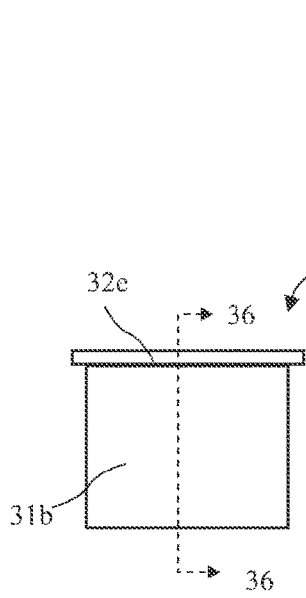
FIG. 35 is a side view of a ninth coffee holder according to the present invention.
Figure 36A:
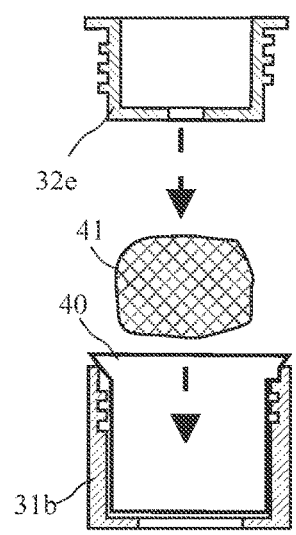
FIG. 36A is a cross-sectional side view of the ninth coffee holder taken along line 36-36 of FIG. 35 showing a portion of coffee for placing inside the coffee holder and a holder lid with a threaded portion for screwing inside the holder body for sealing according to the present invention.
Figure 36B:
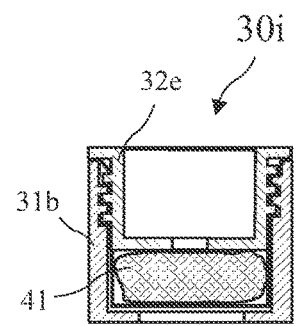
FIG. 36B is a cross-sectional side view of the ninth coffee holder taken along line 36-36 of FIG. 35 showing the portion of coffee inside the coffee holder and a holder lid with the threaded portion screwed into the holder body and tamping the coffee according to the present invention.

A side view of a ninth coffee holder 30*i* according to the present invention is shown in FIG. 35, a cross-sectional side view of the ninth coffee holder 30*i* taken along line 36-36 of FIG. 35 showing a portion of coffee 41 for placing inside the coffee holder and a fifth holder lid 32e with a threaded portion for screwing inside the holder base 31b for sealing is shown in FIG. 36A, and a cross-sectional side view of the ninth coffee holder 30i taken along line 36-36 of FIG. 35 showing the portion of coffee 41 inside the coffee holder and the holder lid 32e with the threaded portion screwed into the coffee holder and tamping the coffee 41 is shown in FIG. 36B. The threads both provide tamping and sealing the coffee to reduce or prevent the coffee 41 from escaping when the flow of hot water is provided to the coffee holder 30h. The holder base 31b is preferably cylindrical to facilitate having internal threads, and at least the threaded portion is preferably cylindrical.

Figures 37A, 37B, 37C:
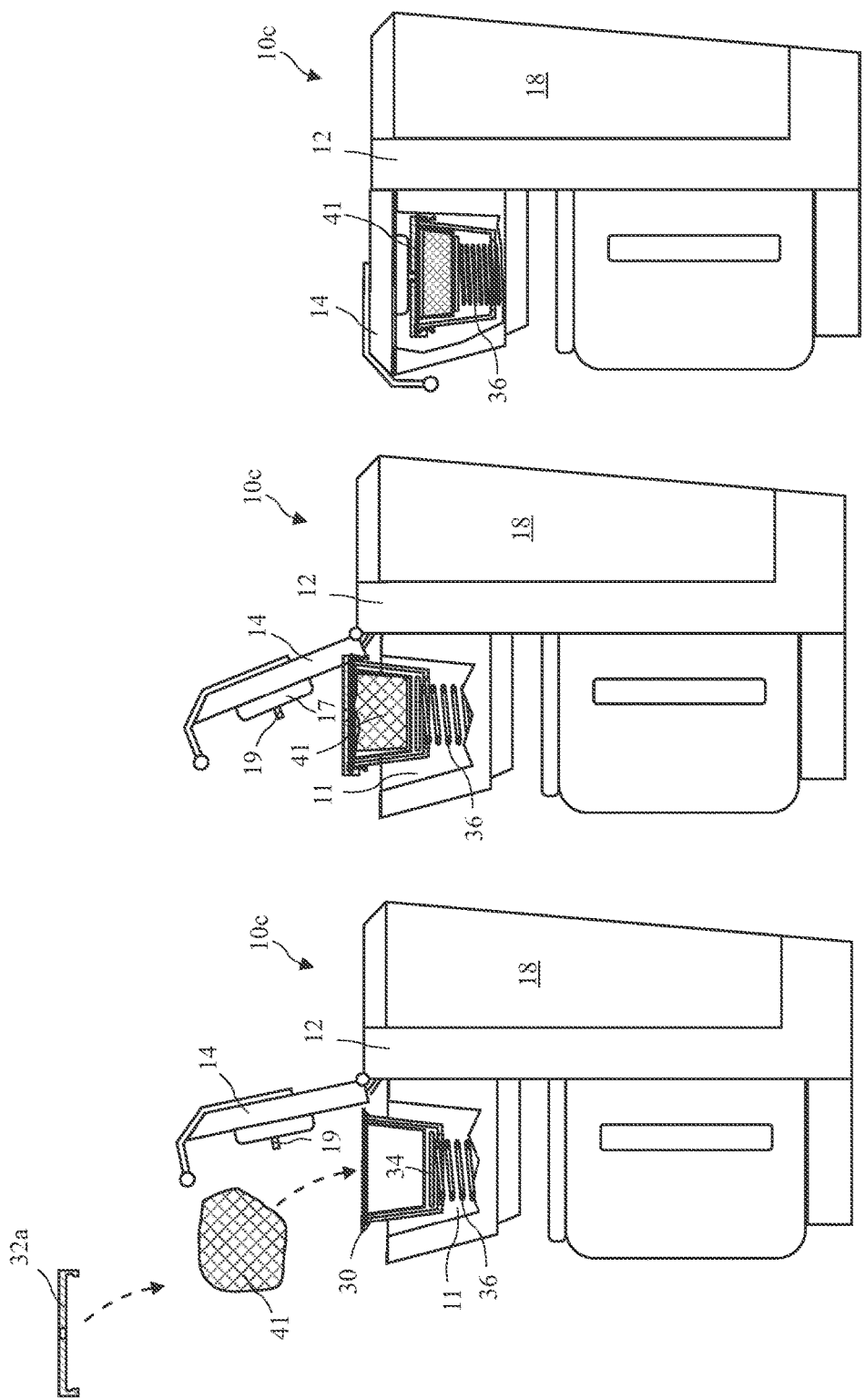
FIG. 37A shows a third coffee maker having a coffee holder for receiving a portion of coffee and tamping spring according to the present invention for tamping the coffee when the coffee maker lid is closed.
FIG. 37B shows the third coffee maker with the coffee holder holding the portion of coffee and the tamping spring under the coffee holder according to the present invention for tamping the coffee when the coffee maker lid is closed.
FIG. 37C shows the third coffee maker with the coffee holder holding the portion of tamped coffee with the coffee maker lid closed for tamping the coffee according to the present invention.

A third coffee maker 10c having a coffee holder 30 according to the present invention for receiving a portion of coffee and a tamping spring 36 for tamping the coffee is shown in FIG. 37A, the third coffee maker 10c with the coffee holder 30 holding the portion of coffee 41 is shown in FIG. 37B, and the third coffee maker 10c with the coffee holder 30 holding the portion of coffee 41 with the coffee maker lid 14 closed for tamping the coffee 41 is shown in FIG. 37C. When the lid 14 is closed, the pad 17 pushes the coffee holder 30 down and the tamping spring 36 enters the bottom of the coffee holder 30 to tamp the coffee 41. While attaching the lid 32a to the holder 30 is preferred in order to prevent coffee grounds from escaping the holder 30, the coffee maker 10c may also be used without the lid 32a and the pad 17 may serve to seal the coffee 41 in the holder 30. In this instance, the coffee maker lid 14 serves as a coffee holder lid.

A third coffee maker 10c having a coffee holder for receiving a portion of coffee and tamping spring 36 attached to the coffee maker lid 14 according to the present invention for tamping the coffee 41 when the coffee maker lid 14 is closed is shown in FIG. 38A, the third coffee maker with the coffee holder 30 holding the portion of coffee 41 is shown in FIG. 38B, and the third coffee maker 10c with the coffee holder 30 holding the portion of coffee 41 with the coffee maker lid 14 closed to push the tamping spring 36 into the coffee holder 30 for tamping the coffee 41 is shown in FIG. 38C.

A fourth coffee maker 10d having a third holder base 31c for receiving a packet 41a containing untamped coffee, a knife 50 for cutting the packet 41a open, and tamping spring 36 under the holder base 31c according to the present invention for tamping the coffee when the coffee maker lid is closed is shown in FIG. 39A, the fourth coffee maker 10d with the holder base 31c holding the packet 41a of untamped coffee is shown in FIG. 39B, and fourth coffee makers with the holder base 31c holding the packet of tamped coffee 41c with the coffee maker lid 14 closed to push the holder base down over the tamping spring 36 for tamping the coffee is shown in FIG. 39C. The coffee maker 10d includes a somewhat pointed nozzle 19a to puncture the packet 41a to provide the flow of hot water to the tamped coffee in the packet 41a. Known coffee packets include internal filters to allow a flow of hot water through the packet to make the coffee drink while preventing coffee grounds from escaping. The cut in the packet 41a made by the knife 50 allows the coffee drink to escape from the packet while filter material in the packet 41a prevents coffee grounds from escaping. The tamping spring 36 may also be attached to the lid 14 as in FIGS. 38A-38C.

The packet 41a may be an air tight pod containing coffee in filter paper and positioning the knife on the side of the holder base 31c results in less likelihood of the knife 50 cutting the filter paper. The packet 41a is preferably air tight to maintain coffee freshness and may be plastic, metal foil, or other air tight material which is sufficiently flexible to allow the coffee contained in the packet 41a to be tamped. Alternatively, the knife 50 may be eliminated when the packet 41a is configured to burst under pressure to expose the coffee, for example, when the coffee maker tamps the coffee, the packet 41a also bursts. In one embodiment, filter paper 41 is inserted into the holder base 31c without the knife 50, and the packet 41a bursts during compacting to release the coffee into the filter paper.

Known coffee makers use a sealed cup or capsule having a somewhat ridged cup with a foil cover. Such cups might be compressible and used in the coffee maker 10d, however, a similar cup or capsule having a less ridged cup which may be compressed in the coffee maker 10d are more suitable for use in the coffee maker 10d to allow tamping of the coffee contained in the cup or capsule.

Figure 40C:
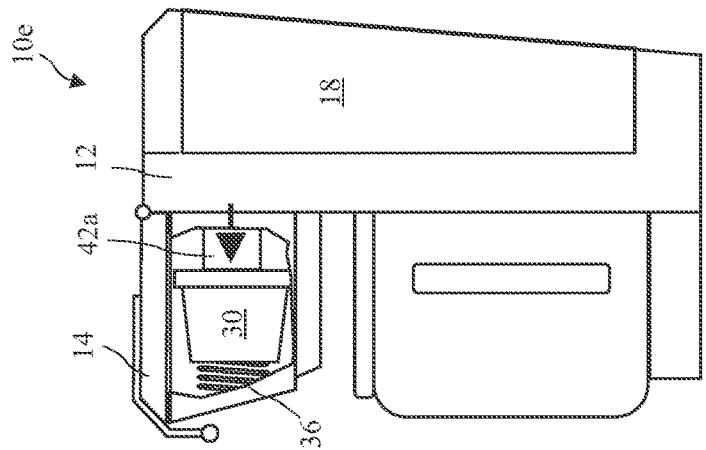
FIG. 40C shows the fifth coffee maker with the coffee holder residing horizontally in the coffee holder cavity with the coffee maker lid closed and the coffee holder pushed against the tamping spring for tamping the coffee, according to the present invention.
Figure 40B:
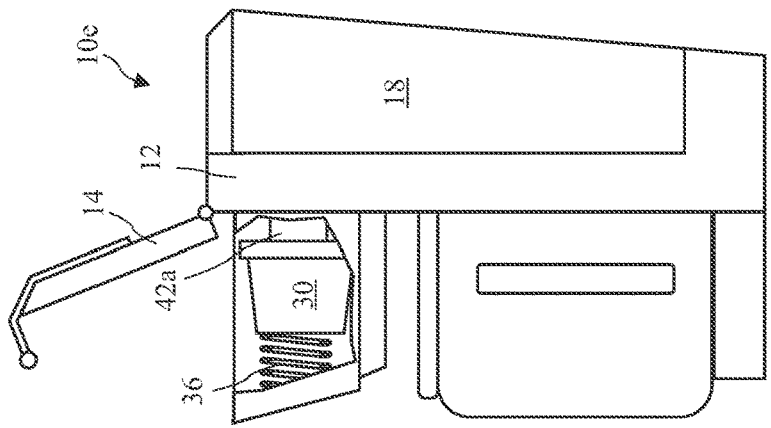
FIG. 40B shows the fifth coffee maker with the coffee holder residing horizontally in the coffee holder cavity according to the present invention for tamping the coffee when the coffee maker lid is closed.
Figure 40A:
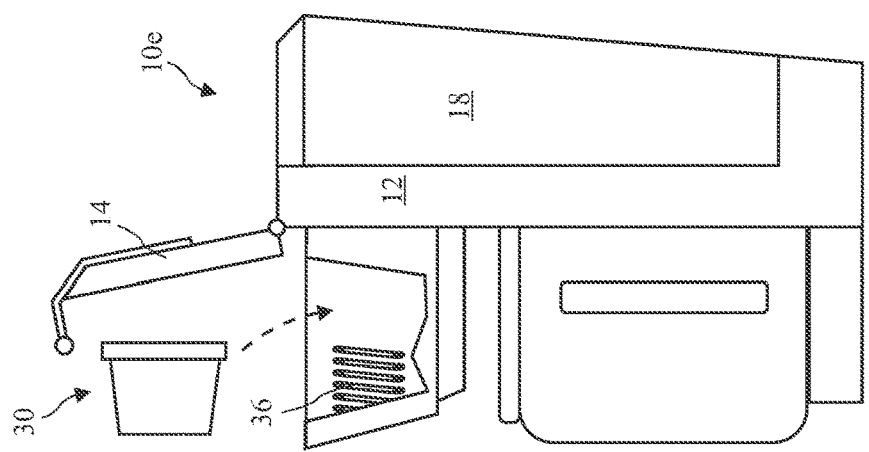
FIG. 40A shows a fifth coffee maker accepting a horizontal coffee holder and tamping spring residing horizontally in a coffee holder cavity according to the present invention for tamping the coffee when the coffee maker lid is closed.

A fifth coffee maker 10e for horizontally receiving the coffee holder 30 is shown in FIG. 40A, the fifth coffee maker with the coffee holder 30 residing in the coffee maker is shown in FIG. 40B, and the fifth coffee maker with the coffee maker lid 14 closed and the tamping spring 36 entering the coffee holder 30 for tamping the coffee 41 is shown in FIG. 40C. The fifth coffee maker 10d may alternatively include a tamping spring entering the coffee holder top, or a resilient solid block pushed into the coffee holder 30 to tamp the coffee. Preferably, a horizontal ram 42a is actuated when the lid 14 is closed and pushes the coffee holder 30 against the spring 36 to tamp the coffee. The horizontal ram 42a may be actuated by an electrical solenoid, by pressure, or by mechanical levers connected to the lid 14. The fifth coffee maker 10e may further include any of the features described above for other embodiments of the coffee maker according to the present invention and may be configured to use any of the coffee holders described above according to the present invention.

A side view of a tenth coffee holder 30j with straight walls according to the present invention is shown in FIG. 41, and a cross-sectional view of the tenth coffee holder 30j taken along line 42-42 of FIG. 41 showing an empty coffee holder is shown in FIG. 42. The coffee holder 30j provides straight cylindrically inside walls allowing a better fit between the top tamper 35b and the inside walls to reduce or eliminate coffee 41 escaping past the top tamper 35b during tamping. A cross-sectional view of the tenth coffee holder 30j taken along line 42-42 of FIG. 41 showing a full and tamped coffee holder is shown in FIG. 43. The tamping spring 36 has been pushed down by the lid 32b to tamp the coffee 41.

A side view of an eleventh coffee holder 30k with straight walls according to the present invention is shown in FIG. 44, a cross-sectional view of the eleventh coffee holder 30k taken along line 45-45 of FIG. 44 showing an empty coffee holder is shown in FIG. 45, and a cross-sectional view of the eleventh coffee holder 30k taken along line 45-45 of FIG. 41 showing a full and tamped coffee holder. As with the coffee holder 30j, the coffee holder 30k provides straight cylindrically inside walls allowing a better fit between the lid 32f and the inside walls to reduce or eliminate coffee 41 escaping past the lid 32f during tamping. The lid 32f may be used with or without the top tamper 35b.

A side view of a top tamper 35b is shown in FIG. 47A and a top view of the top tamper 35B is shown in FIG. 47B. A side view of a top tamper 35b' with a seal 60 according to the present invention is shown in FIG. 47C and a top view of the top tamper 35b' with the seal 60 is shown in FIG. 47D. In some instances, for example with a very fine ground coffee, an amount of coffee may escape past the top tamper 35b. In such instances, a user may prefer to use the top tamper 35b' with the seal 60 to reduce or eliminate the escape of the coffee.

A perspective view of a filter paper cup 40' with a folding cup lid 40d is shown in FIG. 48 (also see FIG. 7C). The cup lid 40d may be folded over the rim 40c to reduce or prevent coffee from escaping during tamping of subsequent processing. The lid 40d may also include a perforation 40e centered on the lid 40d allowing the nozzle 19 to enter and/or inject the hot flow of water into the tamped coffee 41, but in some embodiments, the lid 40d does not include the perforation 40e. The filter paper cup 40' may be used in the coffee containers described herein, and may also be used in a coffee machine having a cavity for receiving the filter paper cup 40'. While the cup 40' is preferably made from filter paper, the cup may also be made from a reusable mech.

Figure 49:
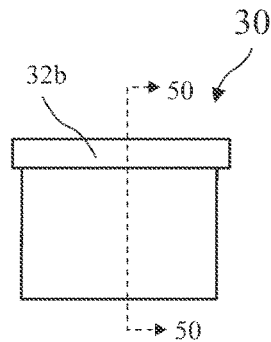
FIG. 49 is a side view of a twelfth coffee holder with straight walls according to the present invention.
Figure 50:
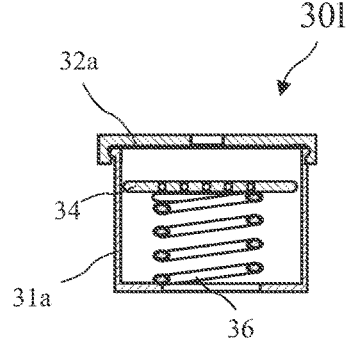
FIG. 50 is a cross-sectional view of the twelfth coffee holder taken along line 50-50 of FIG. 49 showing an empty coffee holder.

A side view of a twelfth coffee holder 30l with straight walls according to the present invention is shown in FIG. 49, and a cross-sectional view of the twelfth coffee holder 30l taken along line 50-50 of FIG. 49 showing an empty coffee holder is shown in FIG. 50. The twelfth coffee holder 30l includes a straight walled base and the tamping spring below the coffee, and additionally uses a filter paper cup 40' with the folding lid 40d.

Figure 51A:
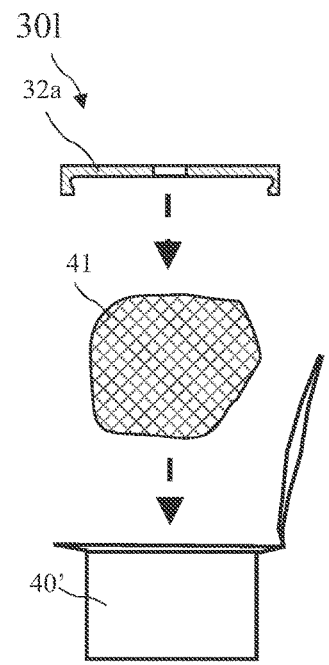
FIG. 51A is a cross-sectional view of the twelfth coffee holder taken along line 50-50 of FIG. 49 showing a lid, coffee, a filter paper cup, above the base, and the coffee holder base.
Figure 51B:
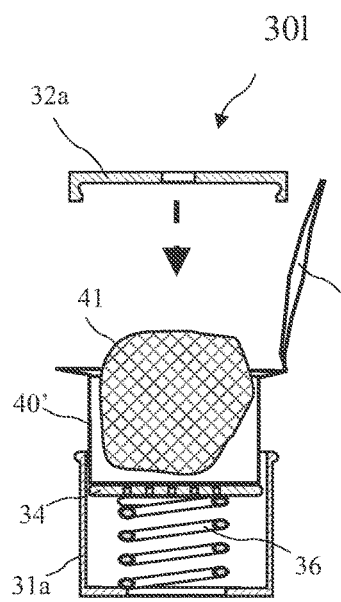
FIG. 51B is a cross-sectional view of the twelfth coffee holder taken along line 50-50 of FIG. 49 showing the lid, above the coffee and the filter paper cup resting in the coffee holder base.
Figure 51C:
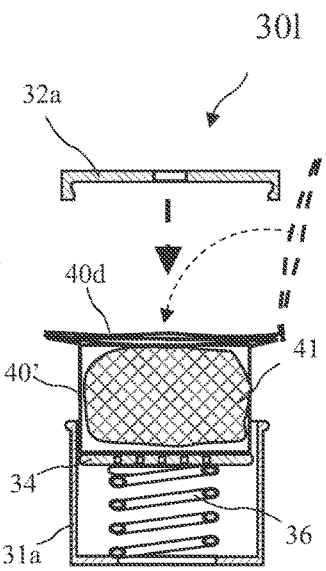
FIG. 51C is a cross-sectional view of the twelfth coffee holder taken along line 50-50 of FIG. 49 showing the lid, above the coffee and the filter paper cup resting in the coffee holder base with a filter paper cover folded over the coffee in the filter paper cup.
Figure 51D:
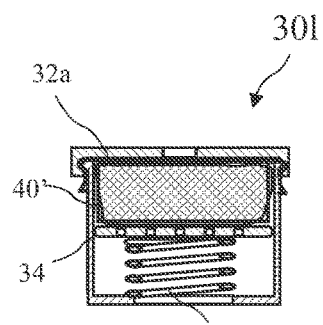
FIG. 51D is a cross-sectional view of the twelfth coffee holder taken along line 50-50 of FIG. 49 showing the lid attached to the base with the coffee and the filter paper cup residing in the coffee holder base with the coffee tamped.

A cross-sectional view of the twelfth coffee holder 30l taken along line 50-50 of FIG. 49 showing the lid 32a, coffee 41, the filter paper cup 40' with lid 40d, above the coffee holder base 31a is shown in FIG. 51A, a cross-sectional view of the twelfth coffee holder 30l taken along line 50-50 of FIG. 49 showing the lid 32a, above the coffee 41 and the filter paper cup 40' resting in the coffee holder base 31a is shown in FIG. 51B, a cross-sectional view of the twelfth coffee holder 30l taken along line 50-50 of FIG. 49 showing the lid 32a, above the coffee 41 and the filter paper cup 40' resting in the coffee holder base 31a with the filter paper cover 40d folded over the coffee 41 in the filter paper cup 40' is shown In FIG. 51C, and a cross-sectional view of the twelfth coffee holder 30l taken along line 50-50 of FIG. 49 showing the lid 32a attached to the base 31a with the coffee 41 and the filter paper cup 40' residing in the coffee holder base 31a with the coffee 41 tamped is shown in FIG. 51D. In embodiments with the coffee 41 partially exposed above the base 31a, some coffee 41 may escape during tamping. Using the filter paper cup 40' having the fold over paper lid 40d reduces or eliminates such escape of coffee 41.

Figure 52:
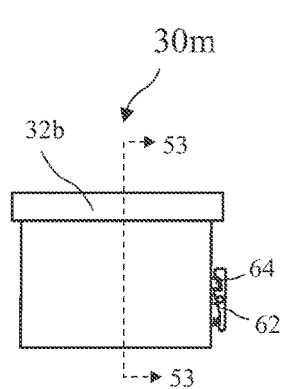
FIG. 52 is a side view of a thirteenth coffee holder with a releaseable tamping latch according to the present invention.
Figure 53:
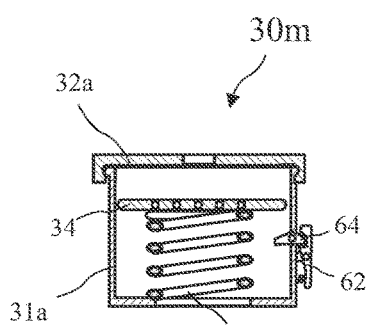
FIG. 53 is a cross-sectional view of the thirteenth coffee holder taken along line 53-53 of FIG. 52 showing an empty coffee holder.

A side view of a thirteenth coffee holder 30m with a releaseable tamping latch 64 according to the present invention is shown in FIG. 52 and a cross-sectional view of the thirteenth coffee holder 30m taken along line 53-53 of FIG. 52 showing an empty coffee holder is shown in FIG. 53. The latch 64 is held in a latched position by a spring loaded lever 62 on the exterior of the base 31a.

Figure 54A:
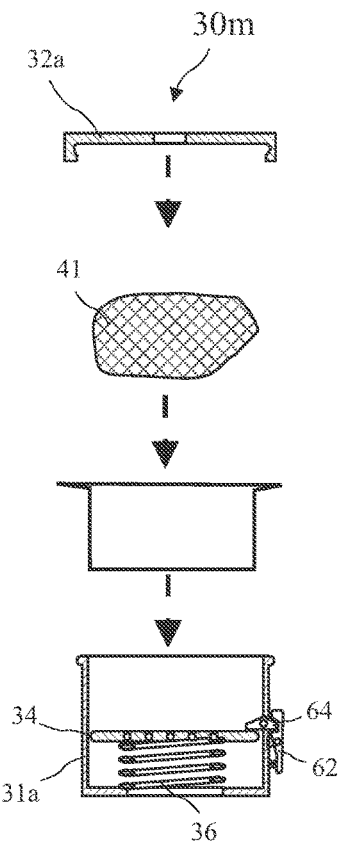
FIG. 54A is a cross-sectional view of the thirteenth coffee holder taken along line 53-53 of FIG. 52 showing a lid, coffee, a filter paper cup, above the base, and the coffee holder base, with the tamping latch retaining the bottom tamper.
Figure 54B:
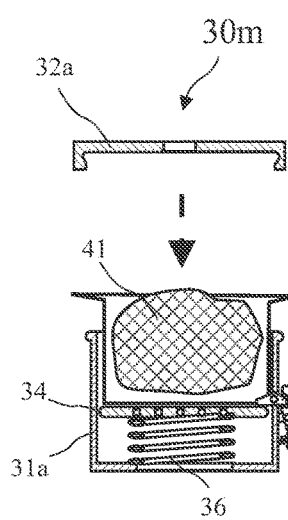
FIG. 54B is a cross-sectional view of the thirteenth coffee holder taken along line 53-53 of FIG. 52 showing the lid, above the coffee and the filter paper cup resting in the coffee holder base, with the tamping latch retaining the bottom tamper.
Figure 54C:
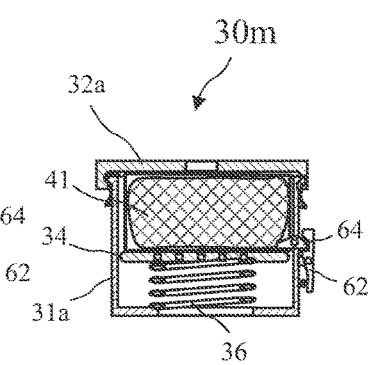
FIG. 54C is a cross-sectional view of the thirteenth coffee holder taken along line 53-53 of FIG. 52 showing the lid, above the coffee and the filter paper cup resting in the coffee holder base with the tamping latch retaining the bottom tamper.
Figure 54D:
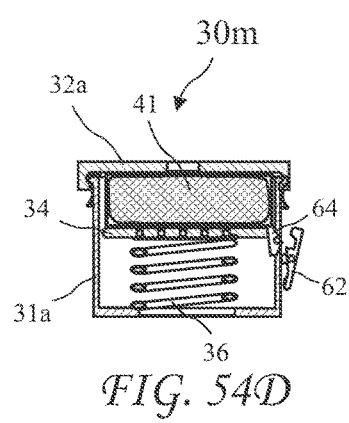
FIG. 54D is a cross-sectional view of the fourteenth coffee holder taken along line 53-53 of FIG. 52 showing the lid attached to the base with the coffee and the filter paper cup residing in the coffee holder base with tamping latches released and the coffee tamped.

A cross-sectional view of the thirteenth coffee holder 30m taken along line 53-53 of FIG. 52 showing the lid 32a, coffee 41, the filter paper cup 40, above the base 31a, and the coffee holder base 31a, with the tamping latch 64 retaining the bottom tamper 34 is shown in FIG. 54A, a cross-sectional view of the thirteenth coffee holder 30m taken along line 53-53 of FIG. 52 showing the lid 32a above the coffee 41 and the filter paper cup 40 resting in the coffee holder base 31a, with the tamping latch 64 retaining the bottom tamper 34 is shown in FIG. 54B, a cross-sectional view of the thirteenth coffee holder 30m taken along line 53-53 of FIG. 52 showing the lid 32a, above the coffee 41 and the filter paper cup 40 resting in the Coffee holder base 31a with the tamping latch 64 retaining the bottom tamper 34 is shown in FIG. 54C, and a cross-sectional view of the fourteenth coffee holder 30m taken along line 53-53 of FIG. 52 showing the lid 32a attached to the base 31a with the coffee 41 and the filter paper cup 40 residing in the coffee holder base 31a with tamping latch 64 released and the coffee 41 tamped is shown in FIG. 54D. The lever 62 thus holds the latch 64 until the lever 62 is pushed to release the latch 62 to release the bottom tamper 34 to tamp the coffee 41.

A side view of a fourteenth coffee holder 30n with a releaseable tamping latch 64 according to the present invention is shown in FIG. 55 and a cross-sectional view of the fourteenth coffee holder taken along line 56-56 of FIG. 55 showing an empty coffee holder is shown in FIG. 56. The lever 62 holds the latch 64 until the arm 66 attached to the lid 32g pushes the lever 62 to release the latch 64.

A cross-sectional view of the fourteenth coffee holder 30n taken along line 56-56 of FIG. 55 showing the lid 32g, coffee 41, and the filter paper cup 40, above the coffee holder base 31a, with the tamping latch 64 retaining the bottom tamper 34 is shown in FIG. 57A, a cross-sectional view of the fourteenth coffee holder 30n taken along line 56-56 of FIG. 55 showing the lid 32g above the coffee 41 and the filter paper cup 40 resting in the coffee holder base 31a, with the tamping latch 64 retaining the bottom tamper 34 is shown in FIG. 57B, a cross-sectional view of the fourteenth coffee holder 30n taken along line 56-56 of FIG. 55 showing the lid 32g, above the coffee 41 and the filter paper cup 40 resting in the coffee holder base 31a with the tamping latch 64 released but just prior to tamping (the bottom tamper has been released but has not moved upward against the coffee 41) is shown in FIG. 57C, and a cross-sectional view of the fourteenth coffee holder 30n taken along line 56-56 of FIG. 55 showing the lid 32g attached to the base with the coffee 41 and the filter paper cup 40 residing in the coffee holder base 31a with tamping latch 64 released and the coffee 41 tamped is shown in FIG. 57D. The lever 62 thus holds the latch 64 until the lever 62 is pushed by the arm 66 to release the latch 62 to release the bottom tamper 34 to tamp the coffee 41.

Figure 58:
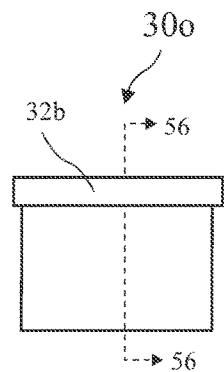
FIG. 58 is a side view of a fourteenth coffee holder with a releaseable tamping lock according to the present invention.
Figure 59:
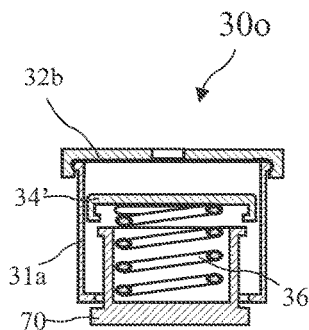
FIG. 59 is a cross-sectional view of the fourteenth coffee holder taken along line 59-59 of FIG. 58 showing an empty coffee holder.

A side view of a fourteenth coffee holder 30o with a releaseable tamping lock according to the present invention is shown in FIG. 58 and a cross-sectional view of the fourteenth coffee holder 30o taken along line 59-59 of FIG. 58 showing an empty coffee holder is shown in FIG. 59. The coffee holder 30o includes a tamping lock 70 which engages a second bottom tamper 34' to hold the second bottom tamper in a down position for filling the coffee holder with coffee and releases the bottom tamper 34' to be pushed upwards by the tamping spring 36 to tamp the coffee after the holder lid 32b is attached to the base 31a.

Figure 60A:
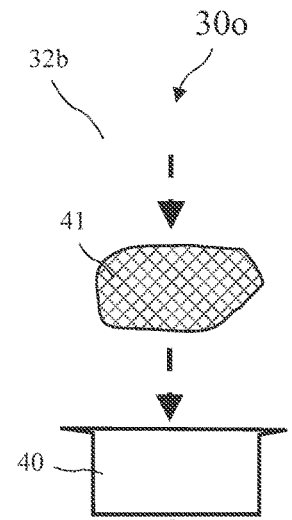
FIG. 60A is a cross-sectional view of the fourteenth coffee holder taken along line 59-59 of FIG. 58 showing a lid, coffee, a filter paper cup, above the base, and the coffee holder base, with the tamping lock retaining the bottom tamper.
Figure 60B:
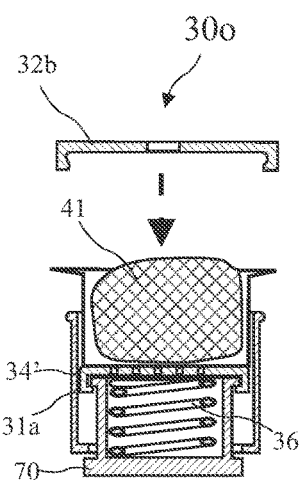
FIG. 60B is a cross-sectional view of the fourteenth coffee holder taken along line 59-59 of FIG. 58 showing the lid, above the coffee and the filter paper cup resting in the coffee holder base, with the tamping lock retaining the bottom tamper.
Figure 60C:
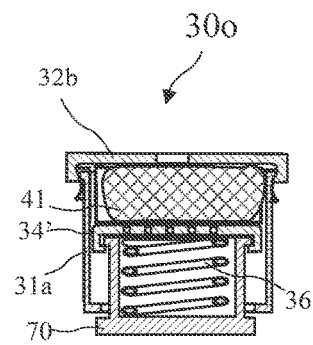
FIG. 60C is a cross-sectional view of the fourteenth coffee holder taken along line 59-59 of FIG. 58 showing the lid, above the coffee and the filter paper cup resting in the coffee holder base prior to tamping.
Figure 60D:
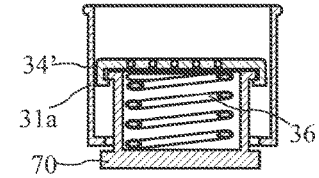
FIG. 60D is a cross-sectional view of the fourteenth coffee holder taken along line 59-59 of FIG. 58 showing the lid attached to the base with the coffee and the filter paper cup residing in the coffee holder base with tamping lock released and the coffee tamped.

A cross-sectional view of the fourteenth coffee holder 30o taken along line 59-59 of FIG. 58 showing a lid 32b, coffee 41, a filter paper cup 40, above the coffee holder base 31, with the tamping lock 70 retaining the bottom tamper 34' is shown in FIG. FIG. 60A, cross-sectional view of the fourteenth coffee holder taken along line 59-59 of FIG. 58 showing the lid, above the coffee and the filter paper cup resting in the coffee holder base, with the tamping latch retaining the bottom tamper 34' is shown in FIG. FIG. 60B, a cross-sectional view of the fourteenth coffee holder taken along line 59-59 of FIG. 58 showing the lid, above the coffee and the filter paper cup resting in the coffee holder base prior to tamping is shown in FIG. 60A, and a cross-sectional view of the fourteenth coffee holder taken along line 59-59 of FIG. 58 showing the lid 32b attached to the base 31a with the coffee 41 and the filter paper cup 41 residing in the coffee holder base 31a with tamping lock released and the coffee tamped is shown in FIG. 60D.

Figure 61:
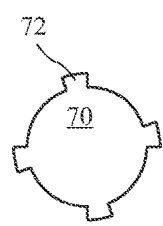
FIG. 61 is a top view of a lock according to the present invention.
Figure 62:
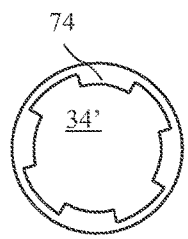
FIG. 62 is a bottom view of a second bottom tamper with cooperates with the tamping lock according to the present invention.

A top view of a tamping lock 70 according to the present invention is shown in FIG. 61 and a bottom view of a second bottom tamper 34' which cooperates with the tamping lock 70 according to the present invention is shown ion FIG. 62. The tamping lock 70 includes teeth 72 which are inserted between and turned to engage lips 74 on the bottom of the bottom tamper 34' to hold the bottom tamper in the down position for filling the coffee holder 30*o* with coffee 41. After the coffee holder 30*o* is filled with coffee and the holder lid 32*b* attached, the tamping lock is twisted to release the bottom tamper 32*b* to tamp the coffee.

Figure 63B:
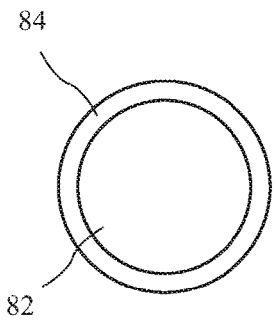
Figure 63A:
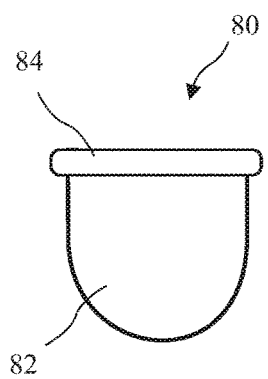

A side view of a filter cup 80 according to the present invention is shown in FIG. 63A and a top view of the filter cup 80 is shown in FIG. 63B. The filter cup 80 includes a ring 84 made a of a material sufficiently strong to hold shape in the proposed use. Filter material 82 is attached to the ring 84. The filter cup 80 is insertable into the coffee holder and in many embodiments is a replacement for the filter paper cup 40.

Figure 64:
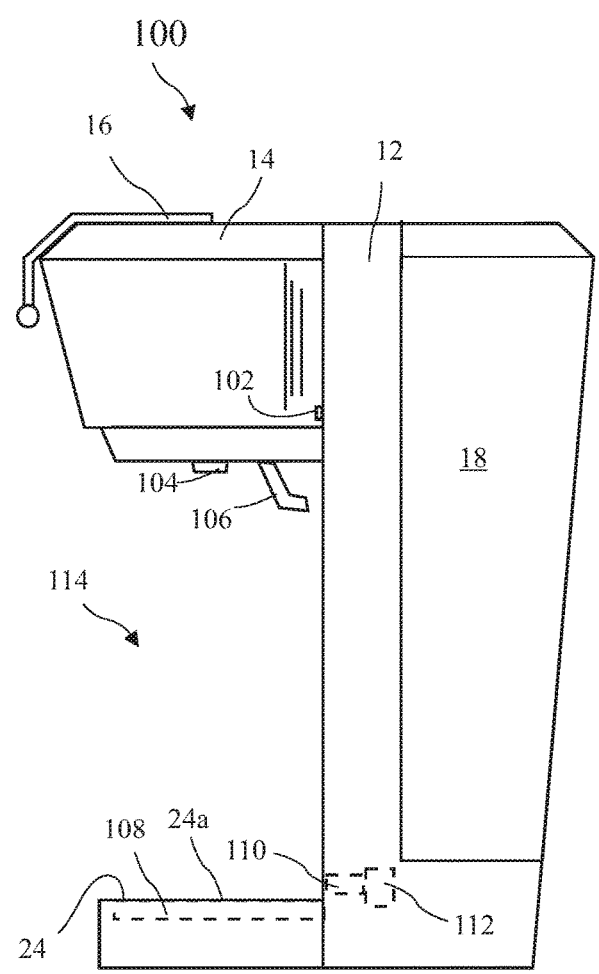

A side view of multi-mode coffee maker 100 according to the present invention is shown in FIG. 64. The multi-mode coffee maker 100 allows the user to easily make a single cup of coffee or several cups of coffee. The multi-mode coffee maker 100 includes manually operated controls 102 for selecting a volume of water for a single cup of coffee or to fill a carafe, residing in the mouth 114 of the multi-mode coffee maker 100. The controls 102 may also allow selection of a large or small cup of coffee, and of hot water only. Alternatively, the multi-mode coffee maker 100 may detect the presence of a single cup adapter 118 and limit the volume of coffee produced to an amount for a single cup, for example as an override if a user accidentally selects a volume of coffee too large for a single cup.

A spout/drip valve 104 releases the desired amount of coffee into a carafe or coffee positioned on a coffee maker platform 24, and a drip valve actuator (or valve lever) 106 is actuateable to open and close the spout/drip valve 104. In other examples, the drip valve actuator may be pneumatic, hydraulic, or electric, and may be any mechanical link which opens the spout/drip valve 104. The spout/drip valve 104 may further be manually opened by a user. For example, the spout/drip valve 104 is opened by placing the multi-cup brewed coffee container 26 in the coffee maker 100 and openable for use of the single cup brewed coffee container 116 by either a mechanical or electrically operated actuator or by positioning the single cup adapter 118 for use of the single cup.

In another embodiment the spout/drip valve 104 is opened by the positioning of a single cup adapter into position for use of a single cup in the coffee maker, for example by an arm on the single cup adapter cooperating with a lever connected to the spout/drip valve, by an arm residing at the rear of the mouth, the single cup adapter pushing against the arm to open the spout/drip valve, or by any mechanical or electrical apparatus connected to the spout/drip valve and actuated by positioning the single cup adapter to use a single cup in the coffee maker. In still another embodiment the flow of brewed coffee is controlled by turning the pump 21 on and off, by controlling a boiler, or by controlling a valve preventing the flow of water to the coffee holder.

A hot plate 108 is recessed on the top surface of the platform 24 and the recess is larger than the footprint of the multi-cup brewed coffee container (or carafe) 26 allowing contact with the hot plate 108 for keeping a carafe at a minimum temperature. A passage 110 allows a finger 120 of a single cup adapter 118 (see FIG. 67B) to engage a switch 112 to change an operating mode of the coffee maker, for example turn off the hot plate 108 when the single cup adapter 118 is in use. The passage 110 is aligned with the platform 24 offset above a top surface 24*a* of the platform 24.

Figure 65A:
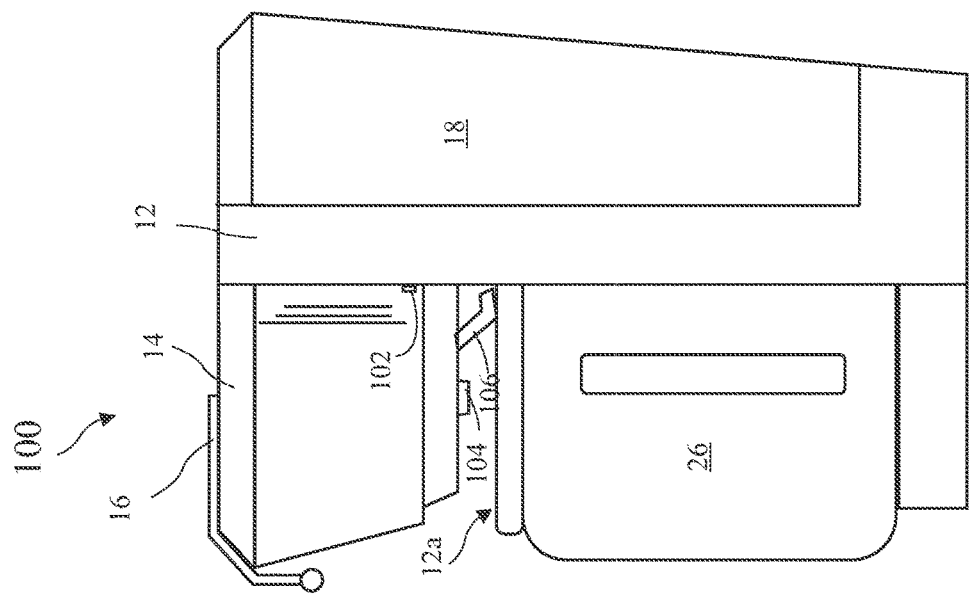
Figure 65B:
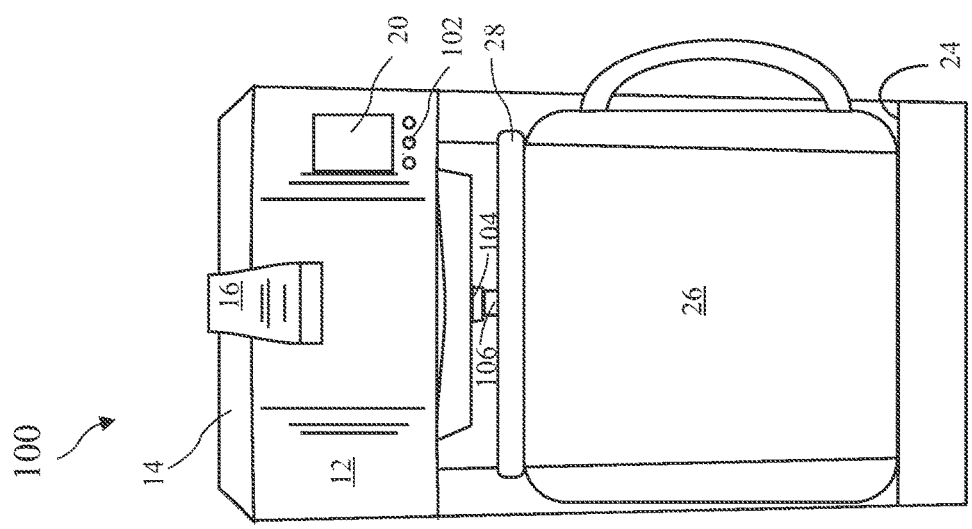

A front view of the multi-mode coffee maker 100 with a carafe 26 residing on the platform 24 for receiving a selected volume of coffee is shown in FIG. 65A and a side view of the multi-mode coffee maker 100 with the carafe 26 positioned for receiving a selected volume of coffee is shown in FIG. 65B. The top edge of the carafe 26 pushes the valve lever 106 upward opening the spout/drip valve 104 to allow the selected volume of coffee to flow into the carafe 26.

Figure 66B:
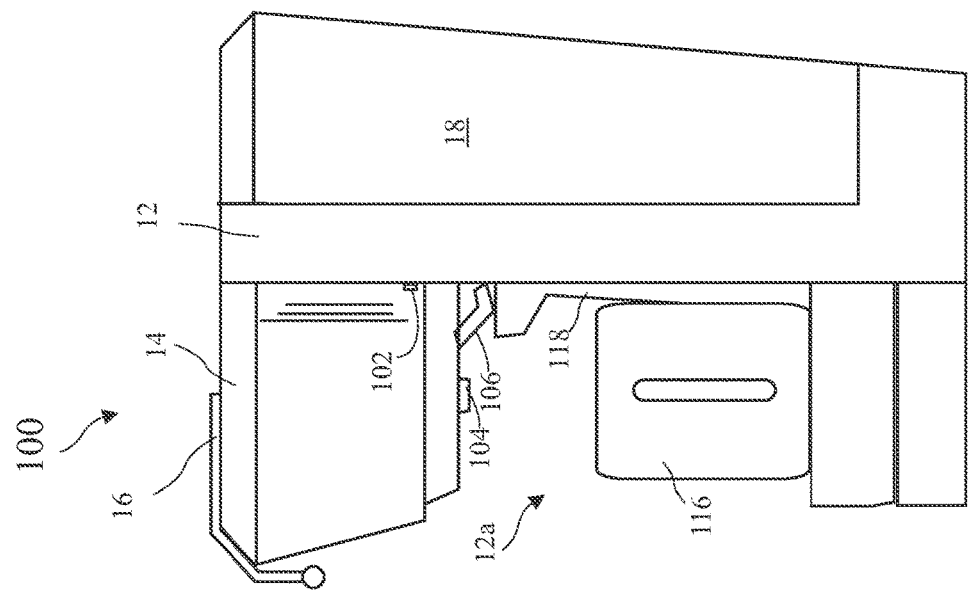
Figure 66A:
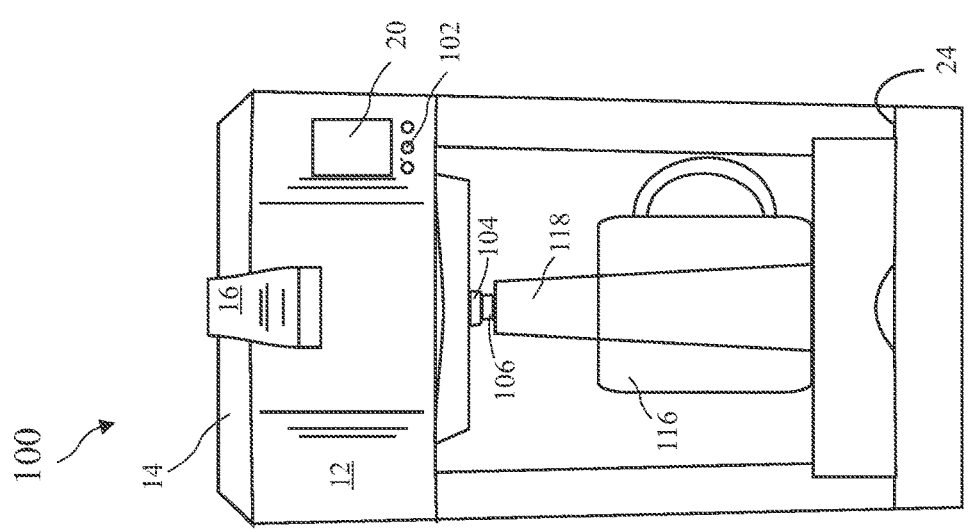

A front view of the multi-mode coffee maker 100 with a coffee cup (or single cup brewed coffee container) 116 residing on a single cup adapter 118 for receiving the selected volume of coffee is shown in FIG. 66A and a side view of the multi-mode coffee maker 100 with the coffee cup residing on the single cup adapter 118 for receiving the selected volume of coffee is shown in FIG. 66B. The single cup adapter 118 includes an upward reaching arm portion 118 (see FIG. 67B) which pushes the valve lever 106 upward opening the spout/drip valve 104 to allow the selected volume of coffee to flow into the coffee cup 116.

Figure 67C:
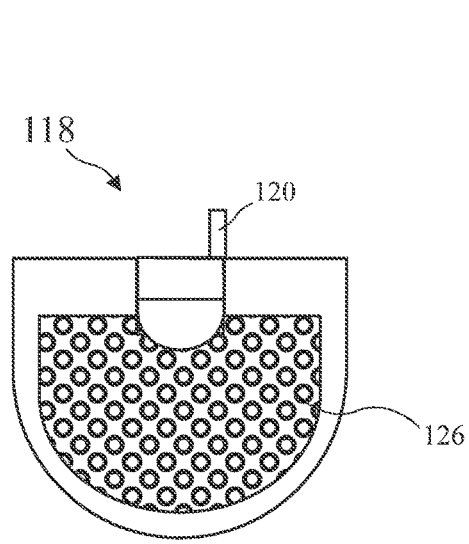
Figure 68:
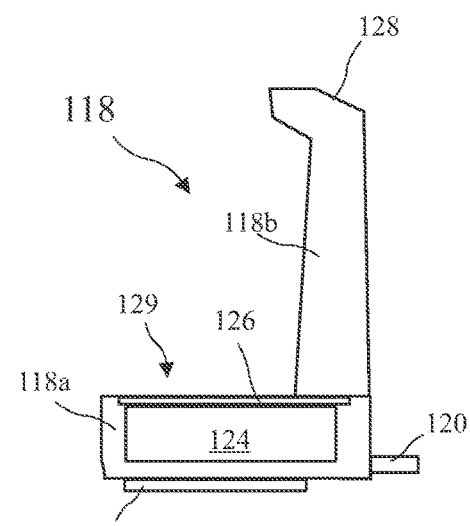
Figure 67A:
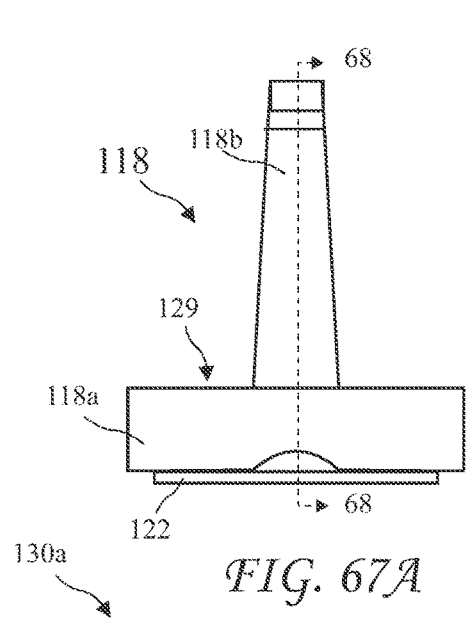
Figure 67B:
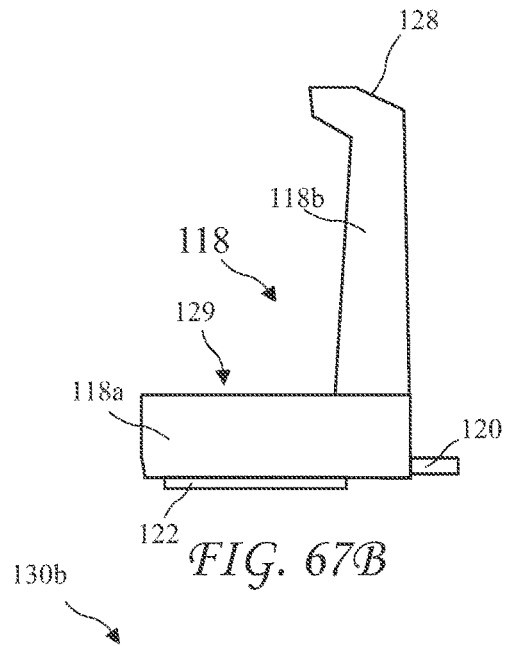

A front view of a single cup adapter 118 according to the present invention is shown in FIG. 67A, a side view of the single cup adapter 118 is shown in FIG. 67B, a top view of the single cup adapter 118 is shown in FIG. 67C, and a cross-sectional view of the single cup adapter 118 taken along line 68-68 of FIG. 67A is shown in FIG. 68. The single cup adapter 118 includes a base portion 118*a* which includes a single cup platform 129 for supporting the coffee cup 116 and a drip basin (or tray) 124 for catching and holding drops from the spout/drip valve 104. A grill 126 resides over the drip basin 124 and the coffee cup 116 rests on the grill 126. An arm portion 118*b* reaches up and an angled surface 128 at the top of the arm portion 118*b* cooperates with the valve lever 106 to open the spout/drip valve 104 when the single cup adapter 118 is positioned in the coffee maker 100. In another embodiment, the drip tray may be integrated into the coffee maker 100 and may pivot or slide into position under the coffee cup 116, for example, the single cup adapter 118 may have an open side or rear that the drip tray slides or pivots into.

A downward protrusion 122 on the bottom of the base portion 118*a* fits into a recess in the platform 24 to correctly position the single cup adapter 118 in the mouth 114 of the coffee maker 100, and to resist easy detachment of the single cup adapter 118 from the coffee maker 100. A rearward reaching finger 120 enters the passage 110 to actuate the switch 112 (see FIG. 64) to turn off the hot plate when the single cup adapter 118 is attached to the coffee maker 100. The finger 120 and switch 112 are one example of a means for turning off the hot plate 108 when the single cup adapter 118 is attached to the coffee maker 100. Other means include a magnet switch detecting the presence of the hot plate 108 in the single cup adapter 118 by the proximity of a magnet and piece of magnetically attractive metal or a second magnet, a switch in the platform, or even a manual switch, and a coffee maker according to the present invention with any switch for turning off the hot plate is intended to come within the scope of the present invention.

A side view of a multi-serving dry coffee holder 130*a* according to the present invention for use in the multi-mode coffee maker 100 for making several cups of brewed coffee is shown in FIG. 66A and a side view of a single-serving dry coffee holder 130*b* according to the present invention for use in the multi-mode coffee maker 100 for making one cup of coffee is shown in FIG. 66B. A variety of dry coffee holders 30a-30o and means for containing and tamping dry coffee in a coffee maker are disclosed in FIGS. 3 through 63B, and a multi-mode coffee maker 100 including any of the coffee holders disclosed herein, or any other coffee holder, is intended to come within the scope of the present invention.

Figure 69A:
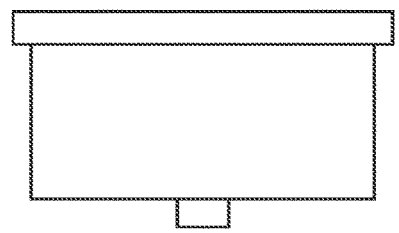
Figure 69B:
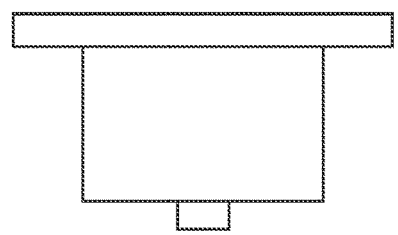

Side views of a multi-serving coffee holder 130a and a side view of a single-serving coffee holder 130b, for use in the multi-mode coffee maker for making several cups of coffee or a single cup of coffee, are shown in FIGS. 69A and 69B respectively.

A perspective view of a coffee maker accessory platform (for example, a mug tray) 200 is shown in FIG. 70A and a top view of the coffee maker mug tray 200 is shown in FIG. 70B. The mug tray 200 includes a pivoting mug (or small cup) support 204 and an actuating assembly 206. A finger 218 extends back from the pivoting mug support 204 to engage the actuating assembly 206. The pivoting mug support 204 cooperates with a base 202 through a pivot 208.

A top perspective view of the mug tray base 202 is shown in FIG. 71A and a front perspective view of the base 202 is shown in FIG. 71B. The pivot 208 is shown on the left side of the base 202 and the actuating assembly 206 is shown at the rear of the base 202.

A right front perspective view of the coffee maker mug tray 200, with a grill removed, is shown in FIG. 72A and a right rear perspective view of the coffee maker mug tray 200, with the grill removed, is shown in FIG. 72B. The finger 218 extends from the rear of the pivoting mug support 204 to engage the actuating assembly 206.

A perspective top view of the actuating assembly 206 is shown in FIG. 73A, a bottom view of the actuating assembly 206 is shown in FIG. 73B, a perspective top view of actuator elements 206a of the actuating assembly 206 are shown in FIG. 74A, and a bottom view of the actuator elements 206a is shown in FIG. 74B. The actuator elements 206a include a pivoting actuator 212, a slide 210, and a spring 216 in an actuator housing 206b. The pivoting actuator 212 pivots about a post (or pivot axis) 207 proximal to a center of the housing 206b and includes an arm 212a and a magnetic element holder 212b. The spring 216 biases the pivoting actuator 212 to center a first magnetic element 214 to the rear adjacent to a sensing (or second magnetic) element 215 (see FIGS. 75A-76B) in the coffee maker. When the magnetic elements 214 and 215 are close together, the second magnetic element 215 senses the first magnetic element 214 and changes an operating mode of the coffee maker. The operating mode may be control of a hot plate at the base of the mouth or may vary the amount of brewed drink provided. For example, the modes may be a multi-cup mode in the coffee maker when the magnetic elements 214 and 215 adjacent, allowing larger amounts of brewed beverage, and a single-cup mode when the magnetic elements 214 and 215 are separated. Either one or both of the magnetic elements 214 and 215 may be magnets or electro-magnets, and when only one is a magnet or electro-magnet, the other is a magnetically attracted material, for example, a ferrous material. The sensing element 215 may further be a Hall effect sensor to sense the proximity of an electrical conducting material residing in the element holder 212b.

In other embodiments, a mug tray may mechanically cooperate with a switch in the coffee maker (for example, the pivoting actuator may mechanically cooperate with a switch in the coffee maker), the mug tray may optically cooperate with a switch in the coffee maker, or the mug tray may close an electrical circuit to cooperate with a switch in the coffee maker. Those skilled in the art will recognize various cooperating structures allowing the coffee maker to sense the presence of the mug tray, or position of a sliding switch, and any such sensing structure used to select the single cup mode or the multi-cup mode is intended to come within the scope of the present invention.

A top view of a drip tray 204 of the coffee maker mug tray 200 pivoted away from the coffee maker and the pivoting actuator 212 and magnetic element 214 cooperating with the sensing element 215 of the coffee maker is shown in FIG. 75A and a top view of the drip tray 204 pivoted into the coffee maker causing the pivoting actuator 212 and magnetic element 214 to be pivoted away from the sensing element 215 of the coffee maker is shown in FIG. 75B. The finger 218 is seen to push the arm 212a to pivot the magnetic element holder 212b and magnetic element 214 away from the sensing element 215.

A top view of the slide 210 of the actuating assembly 206 disengaged from the pivoting actuator 212 and the pivoting actuator 212 and magnetic element 214 cooperating with the sensing element 215 of the coffee maker is shown in FIG. 76A and a top view of the slide of the actuating assembly engaged with the pivoting actuator 212 and the pivoting actuator 212 and magnetic element 214 pivoted away from the sensing element 215 of the coffee maker is shown in FIG. 76B. When the slide 210 is moved against the arm 212a, the pivoting actuator 212 pivots clockwise (top view), and the magnet holder 212b and magnetic element 214 are moved away from the sensing element 215. The slide 210 thus allows the drip tray 204 pivoted away from the coffee maker while the slide 210 selects the single or multi-cup mode.

A coffee maker accessory carafe 26 having a finger 120 for cooperating with the coffee maker to change an operating mode is shown in FIG. 77. The mode may be providing power to a hot plate, or other operating mode.

While the present invention is described above as placing loose coffee in a coffee holder, the invention may also be practiced by placing prepackaged coffee, for example coffee pods, into the coffee holder. Further, while the coffee holder is generally described as having a snap on lid, a screw on lid may also be used, and in general the various elements of different embodiments described above may be mixed to provide new embodiments and such new embodiments are intended to come within the scope of the present invention.

Further, many embodiments are described as including a coffee chamber comprising a filter paper cup. In many cases, a filter cup made of nylon mesh or metal mesh is equally suitable, and any coffee holder or combination of coffee maker and coffee holder including a filter chamber which holds coffee and allows the coffee to be tamped as described above is intended to come within the scope of the present invention regardless of the specific filter material.

While the invention herein disclosed has been described by means of specific embodiments and applications thereof, numerous modifications and variations could be made thereto by those skilled in the art without departing from the scope of the invention set forth in the claims.

We claim:
1. A multi-mode coffee maker comprising:
a body;
a cavity in the body for receiving dry coffee;
a water container attached to the body for providing water to make brewed beverage;
a heater for heating the water to make the brewed beverage;
a mouth on the front of the body for receiving a brewed beverage container; and a removable accessory platform positionable at the bottom of the mouth and cooperating with the coffee maker to select operating modes of the coffee maker, the accessory platform comprising:
   a base;
   a drip tray pivotally connected to the base and having a raised grill for supporting the brewed beverage container, the drip tray pivotable to a closed position towards the coffee maker to support the brewed beverage container and pivotable to an open position away from the coffee maker to provide additional vertical space for the brewed beverage container;
   a finger extending from the pivoting drip tray towards the coffee maker;
   an actuating element including:
      a pivoting actuator having a pivot axis;
      an arm extending radially from the pivot axis;
      a magnetic element holder displaced radially from the pivot axis and having a first position adjacent to a magnetic sensing element and a second position pivoted away from the magnetic sensing element;
      a magnetic element attached to the magnetic element holder and alignable with the magnetic sensing element of the coffee maker to magnetically cooperate with the magnetic sensing element; and
      a spring biasing the pivoting actuator to align the magnetic element holder with the magnetic sensing element;
   wherein, in the closed position of the drip tray, the finger engages the arm to pivot the pivoting actuator to position the magnetic element holder in the second position pivoted away from the magnetic sensing element.

* * * * *